US012682168B1

(12) United States Patent
Romeo et al.

(10) Patent No.: US 12,682,168 B1
(45) Date of Patent: Jul. 14, 2026

(54) STRUCTURED INTERLEAVING OF GENERATIONS AND EXTERNAL INTERACTIONS FOR CONVERSATION-BASED GENERATIVE ARTIFICIAL INTELLIGENCE APPLICATIONS USING EXTENSIBLE ROLE SETS AND HIDDEN MARKERS

(71) Applicant: Amazon Technologies, Inc., Seattle, WA (US)

(72) Inventors: Salvatore Romeo, Alexandria, VA (US); Yi Zhang, Sammamish, WA (US); Tamer A N Alkhouli, San Jose, CA (US); Daniele Bonadiman, Sunnyvale, CA (US); Zhongyuan Zhu, Bellevue, WA (US); Monica Lakshmi Sunkara, San Jose, CA (US); Laura Aina, Barcelona (ES); Sarthak Jain, Seattle, WA (US); Arshit Gupta, Sunnyvale, CA (US); Bonan Min, Palo Alto, CA (US); Kalpit Dixit, Mountain View, CA (US); Brant Swidler, Kauneonga Lake, NY (US); Miguel Ballesteros Martinez, New York, NY (US); Yassine Benajiba, Briarcliff Manor, NY (US); Katrin Kirchhoff, Seattle, WA (US); Dan Roth, Philadelphia, PA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 18/622,557

(22) Filed: Mar. 29, 2024

(51) Int. Cl.
*G10L 15/22* (2006.01)
*G06F 16/3329* (2025.01)
*G06F 40/284* (2020.01)

(52) U.S. Cl.
CPC ........ *G06F 40/284* (2020.01); *G06F 16/3329* (2019.01)

(58) Field of Classification Search
CPC .... G06F 40/284; G06F 16/3329; G06F 40/30; G06F 40/35; G06F 40/40; G06F 16/90332; G06N 20/00; G06N 3/08; G10L 15/22
See application file for complete search history.

(56) References Cited

U.S. PATENT DOCUMENTS 10,838,967 B2 * 11/2020 Wang ...................... G10L 25/63
11,176,466 B2 * 11/2021 Neogi .................... G06N 5/022
(Continued)

OTHER PUBLICATIONS

Patrick Farley, "Working with the Chat models", retrieved from https://github.com/MicrosoftDocs/azure-docs/blob/main/articles/ai-services/openai/includes/chat-markup-language.md, Jan. 28, 2024, pp. 1-11.

(Continued)

*Primary Examiner* — Jakieda R Jackson
(74) *Attorney, Agent, or Firm* — Robert C. Kowert; Kowert, Hood, Munyon, Rankin & Goetzel, P.C.

(57) ABSTRACT

An automated conversation intermediary performs several operations during a conversation between end users and chatbots. Prior to adding natural language input from an end user to a chatbot prompt, the intermediary annotates the input to indicate a role of the end user, using hidden markers for the annotation that are not presented to the end user during the conversation. The intermediary receives output generated by the chatbot, which also includes hidden markers in addition to natural language to be presented to the end user, and removes the hidden markers before providing the natural language portion of the output to the end user.

20 Claims, 13 Drawing Sheets

(56)          References Cited

U.S. PATENT DOCUMENTS

| | | | |
|---|---|---|---|
| 11,336,595 B2 * | 5/2022 | Uppala | G06F 40/35 |
| 11,451,496 B1 * | 9/2022 | Zhang | H04L 51/02 |
| 11,611,492 B2 * | 3/2023 | Murugan | H04L 67/10 |
| 11,893,358 B1 | 2/2024 | Lakshmikanthan et al. | |
| 2018/0052826 A1 * | 2/2018 | Chowdhary | G06F 40/58 |
| 2018/0176385 A1 * | 6/2018 | Raghav | H04M 7/0033 |
| 2019/0034409 A1 * | 1/2019 | Curtis | G06F 40/35 |
| 2020/0344186 A1 * | 10/2020 | Parekh | H04L 51/224 |
| 2021/0097978 A1 * | 4/2021 | Mei | G10L 15/183 |
| 2021/0406473 A1 * | 12/2021 | Park | H04L 51/02 |
| 2022/0050966 A1 * | 2/2022 | Yang | G06N 3/0442 |
| 2022/0101838 A1 * | 3/2022 | George | G06F 16/3329 |
| 2022/0244925 A1 * | 8/2022 | Moss | G10L 15/183 |
| 2022/0398794 A1 * | 12/2022 | Lee | G10L 15/26 |
| 2023/0074406 A1 | 3/2023 | Baeuml et al. | |
| 2023/0112921 A1 | 4/2023 | Cia et al. | |
| 2023/0259705 A1 | 8/2023 | Tunstall-Pedoe et al. | |
| 2023/0350929 A1 | 11/2023 | Hasan et al. | |
| 2024/0020538 A1 | 1/2024 | Socher et al. | |
| 2024/0029901 A1 | 1/2024 | Ezhov et al. | |
| 2025/0117595 A1 * | 4/2025 | Taheri | G06F 40/40 |

OTHER PUBLICATIONS

Rich Harang, "Securing LLM Systems Against Prompt Injection", dated Aug. 3, 2023, pp. 1-8.
U.S. Appl. No. 18/474,119, filed Sep. 25, 2023, Jiangtao Zhang et al.

* cited by examiner

Figure 2:
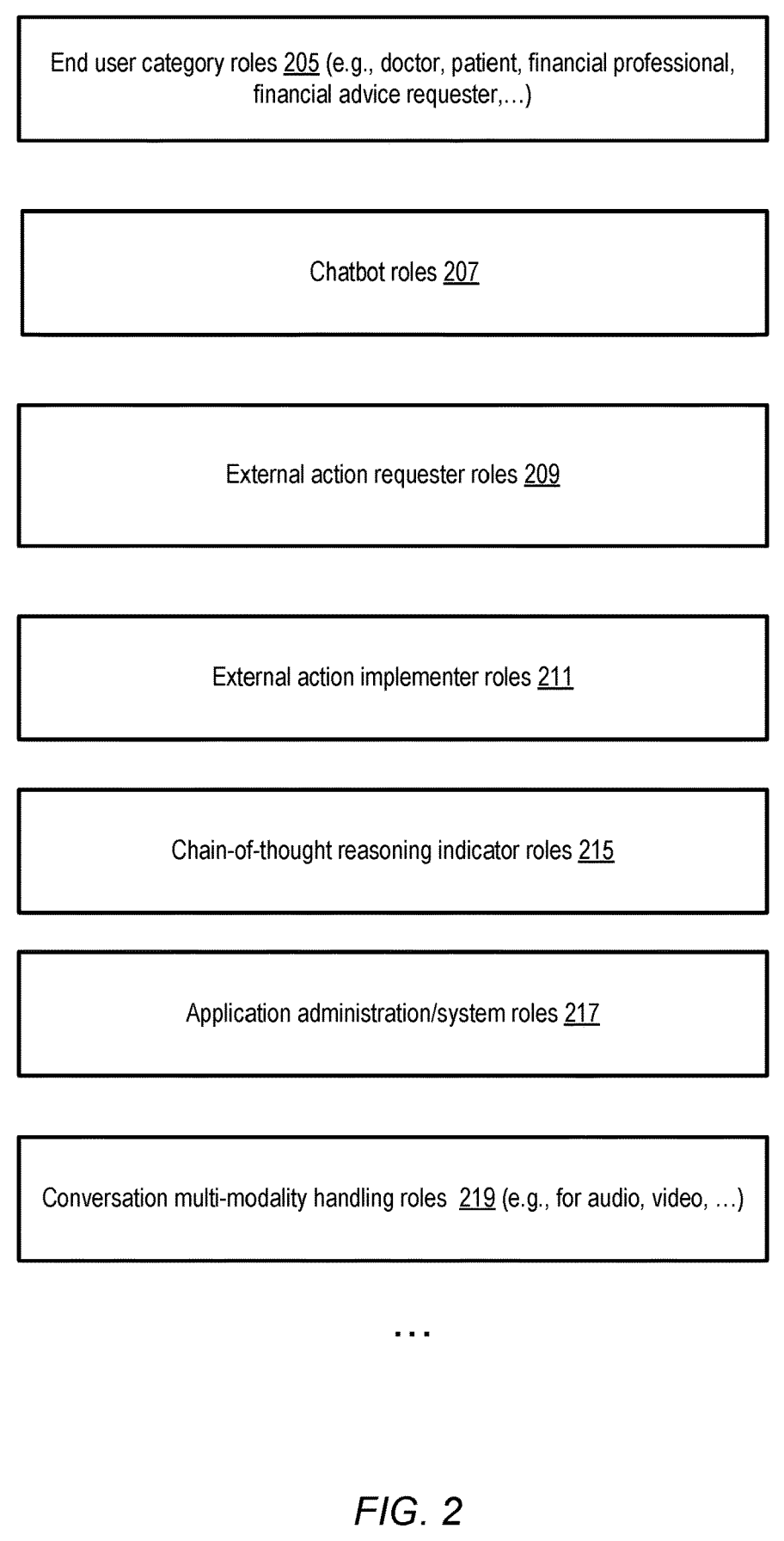

End user category roles 205 (e.g., doctor, patient, financial professional, financial advice requester,...)

Chatbot roles 207

External action requester roles 209

External action implementer roles 211

Chain-of-thought reasoning indicator roles 215

Application administration/system roles 217

Conversation multi-modality handling roles 219 (e.g., for audio, video, ...)

Extensible hidden marker collection 305 (used, e.g., to distinguish/structure conversation elements in prompt/context provided to GAIMs during conversation, and help prevent prompt injection attacks)

 Conversation turn start (TS) marker 302

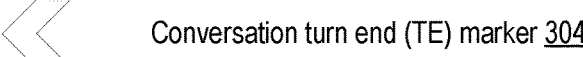 Conversation turn end (TE) marker 304

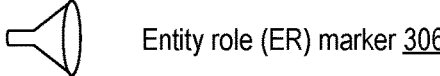 Entity role (ER) marker 306

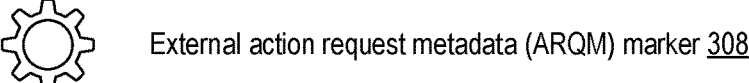 External action request metadata (ARQM) marker 308

External action response metadata (ARSM) marker 310

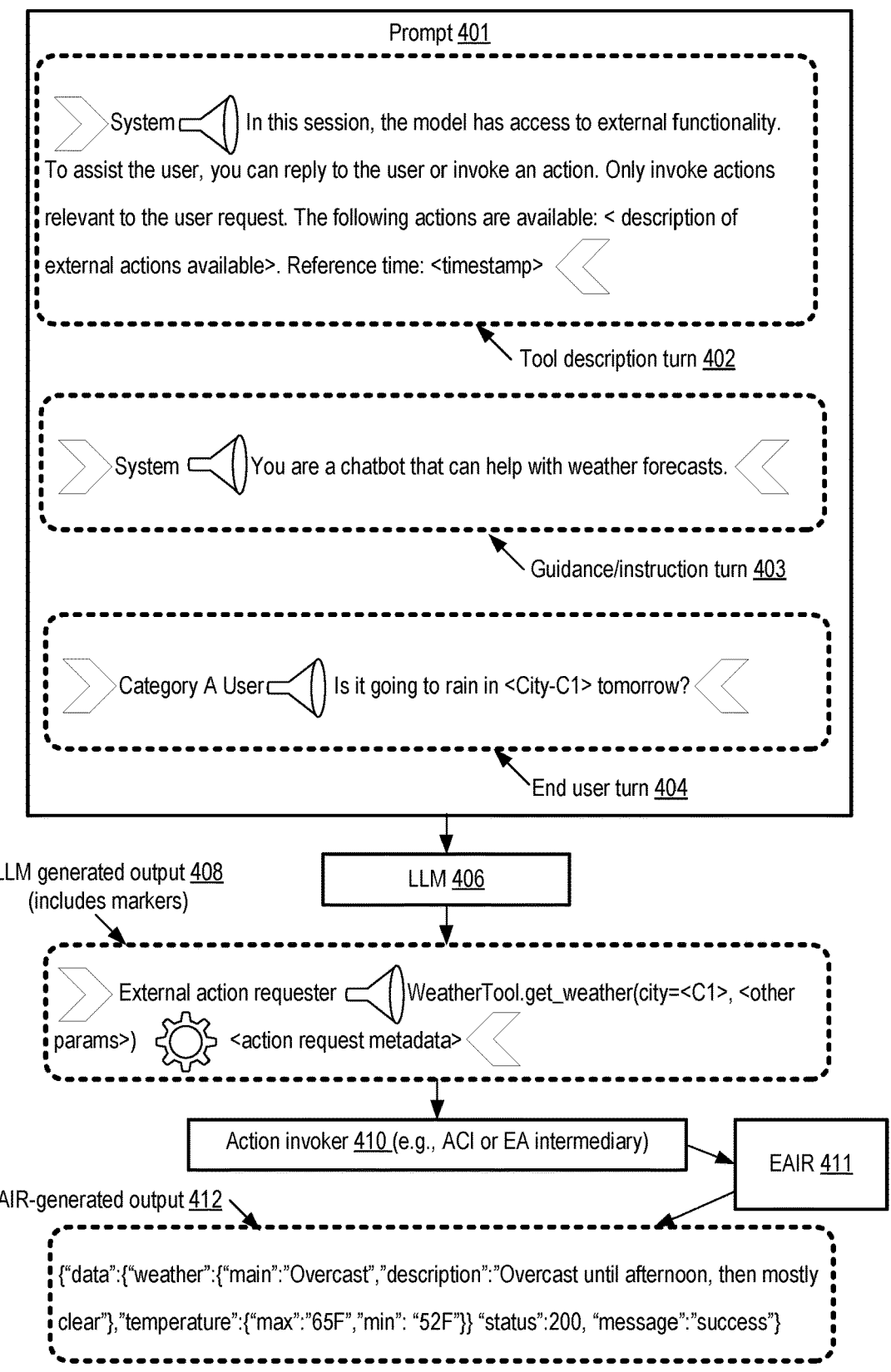

Prompt 401

System In this session, the model has access to external functionality. To assist the user, you can reply to the user or invoke an action. Only invoke actions relevant to the user request. The following actions are available: < description of external actions available>. Reference time: <timestamp>

Tool description turn 402

System You are a chatbot that can help with weather forecasts.

Guidance/instruction turn 403

Category A User Is it going to rain in <City-C1> tomorrow?

End user turn 404

LLM 406

LLM generated output 408 (includes markers)

External action requester WeatherTool.get_weather(city=<C1>, <other params>) <action request metadata>

Action invoker 410 (e.g., ACI or EA intermediary)

EAIR 411

EAIR-generated output 412

{"data":{"weather":{"main":"Overcast","description":"Overcast until afternoon, then mostly clear"},"temperature":{"max":"65F","min": "52F"}} "status":200, "message":"success"}

FIG. 4A

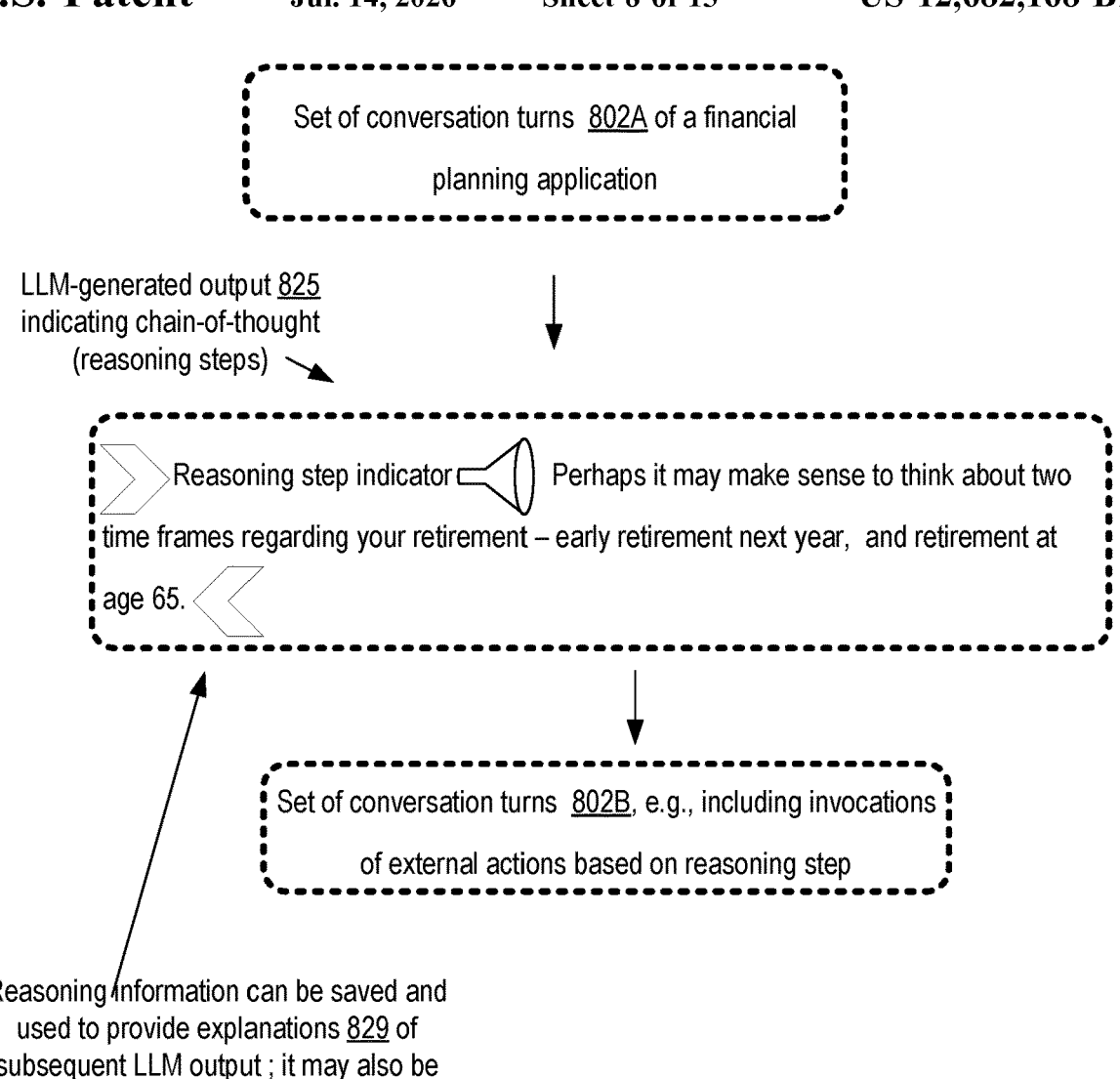

Set of conversation turns 802A of a financial planning application

LLM-generated output 825 indicating chain-of-thought (reasoning steps)

> Reasoning step indicator ◁ Perhaps it may make sense to think about two time frames regarding your retirement – early retirement next year, and retirement at age 65. ‹‹

Set of conversation turns 802B, e.g., including invocations of external actions based on reasoning step Reasoning information can be saved and used to provide explanations 829 of subsequent LLM output ; it may also be provided to the end user when it is generated

*FIG. 5*

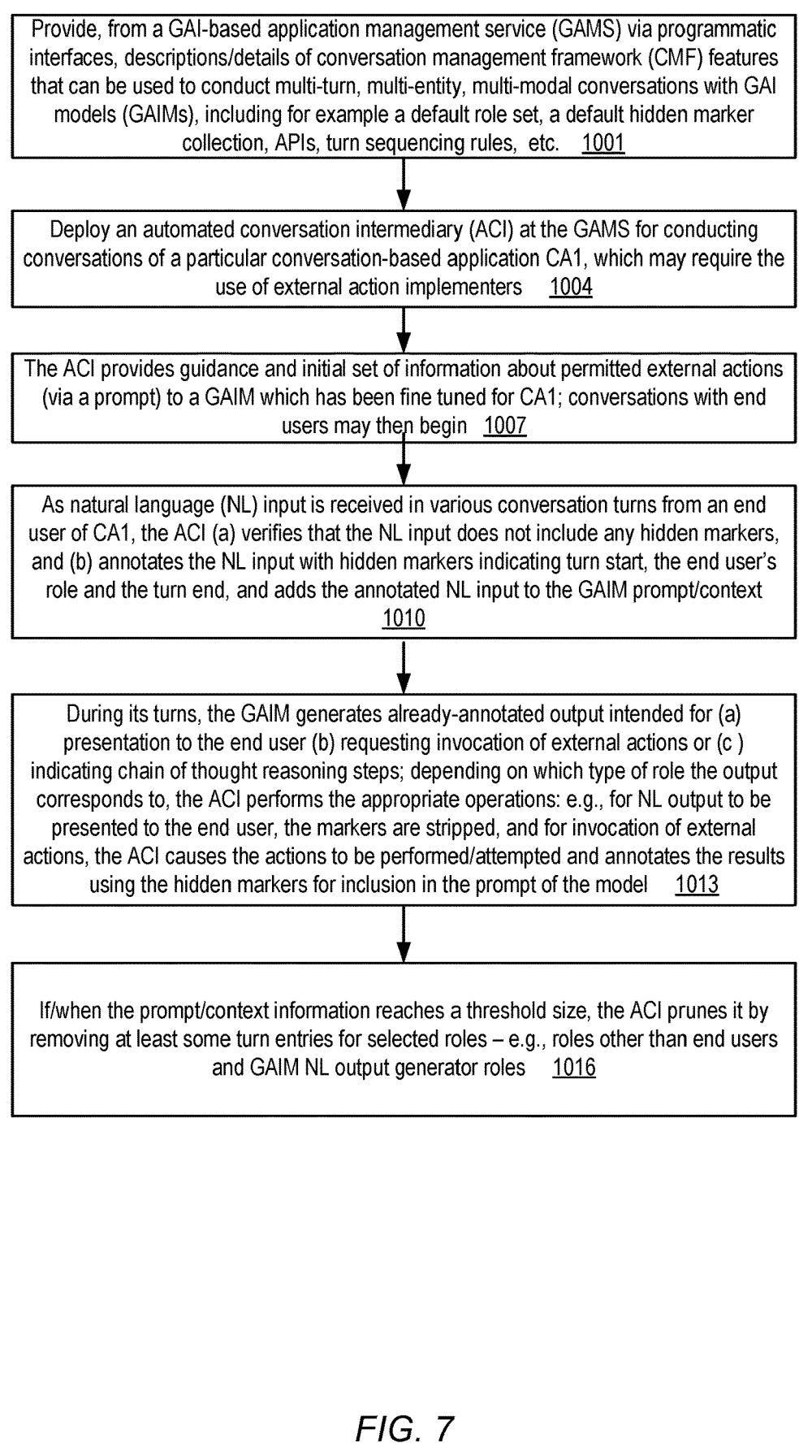

Provide, from a GAI-based application management service (GAMS) via programmatic interfaces, descriptions/details of conversation management framework (CMF) features that can be used to conduct multi-turn, multi-entity, multi-modal conversations with GAI models (GAIMs), including for example a default role set, a default hidden marker collection, APIs, turn sequencing rules, etc.   1001

Deploy an automated conversation intermediary (ACI) at the GAMS for conducting conversations of a particular conversation-based application CA1, which may require the use of external action implementers   1004

The ACI provides guidance and initial set of information about permitted external actions (via a prompt) to a GAIM which has been fine tuned for CA1; conversations with end users may then begin   1007

As natural language (NL) input is received in various conversation turns from an end user of CA1, the ACI (a) verifies that the NL input does not include any hidden markers, and (b) annotates the NL input with hidden markers indicating turn start, the end user's role and the turn end, and adds the annotated NL input to the GAIM prompt/context   1010

During its turns, the GAIM generates already-annotated output intended for (a) presentation to the end user (b) requesting invocation of external actions or (c ) indicating chain of thought reasoning steps; depending on which type of role the output corresponds to, the ACI performs the appropriate operations: e.g., for NL output to be presented to the end user, the markers are stripped, and for invocation of external actions, the ACI causes the actions to be performed/attempted and annotates the results using the hidden markers for inclusion in the prompt of the model   1013

If/when the prompt/context information reaches a threshold size, the ACI prunes it by removing at least some turn entries for selected roles – e.g., roles other than end users and GAIM NL output generator roles   1016

*FIG. 7*

ListAvailableLLMs 1214

LLMList 1215

FineTuneLLM 1217

LLMFineTuningComplete 1219

DeployACI 1221

ACIDeployed 1223

Client 1210
(e.g.,
developer or
application
owner)

AddRole 1225

RoleAdded 1227

GAMS 1212

ViewConversation 1231

ConversationTurnsInfo 1233

GetExplanation 1235

ExplanationData 1237

...

Programmatic interfaces 1277

STRUCTURED INTERLEAVING OF GENERATIONS AND EXTERNAL INTERACTIONS FOR CONVERSATION-BASED GENERATIVE ARTIFICIAL INTELLIGENCE APPLICATIONS USING EXTENSIBLE ROLE SETS AND HIDDEN MARKERS

BACKGROUND

Neural network models, such as transformer-based generative artificial intelligence (GAI) models referred to as large language models (LLMs), have become increasingly more capable in solving complex problems in various domains in recent years. Some GAI models, which have been fine-tuned using domain-specific corpora, can be employed to participate in multi-turn conversations with human users about those domains, with the end goal being to present coherent and relevant responses to the input provided by the users in each turn. In some cases, external actions may also be invoked as part of a conversation, or several end users may participate in a given conversation, making the task of conducting the conversation more complex for the GAI models being used.

BRIEF DESCRIPTION OF DRAWINGS

FIG. 2 illustrates an example extensible set of roles of entities contributing to a conversation conducted with the help of one or more GAI models, according to at least some embodiments.

FIG. 3 illustrates an example extensible set of hidden markers which may be used to demarcate various portions of a prompt provided to a GAI model during a conversation, according to at least some embodiments.

FIG. 4A, FIG. 4B, FIG. 4C and FIG. 4D collectively illustrate an example multi-turn conversation between an end user and a GAI model, according to at least some embodiments.

FIG. 5 illustrates an example of reasoning step output which may be generated by a GAI model during a conversation, according to at least some embodiments.

FIG. 7 is a flow diagram illustrating aspects of operations pertaining to multi-turn conversations in which GAI models are provided structured prompts which include role information and hidden markers, according to at least some embodiments.

Figure 1:
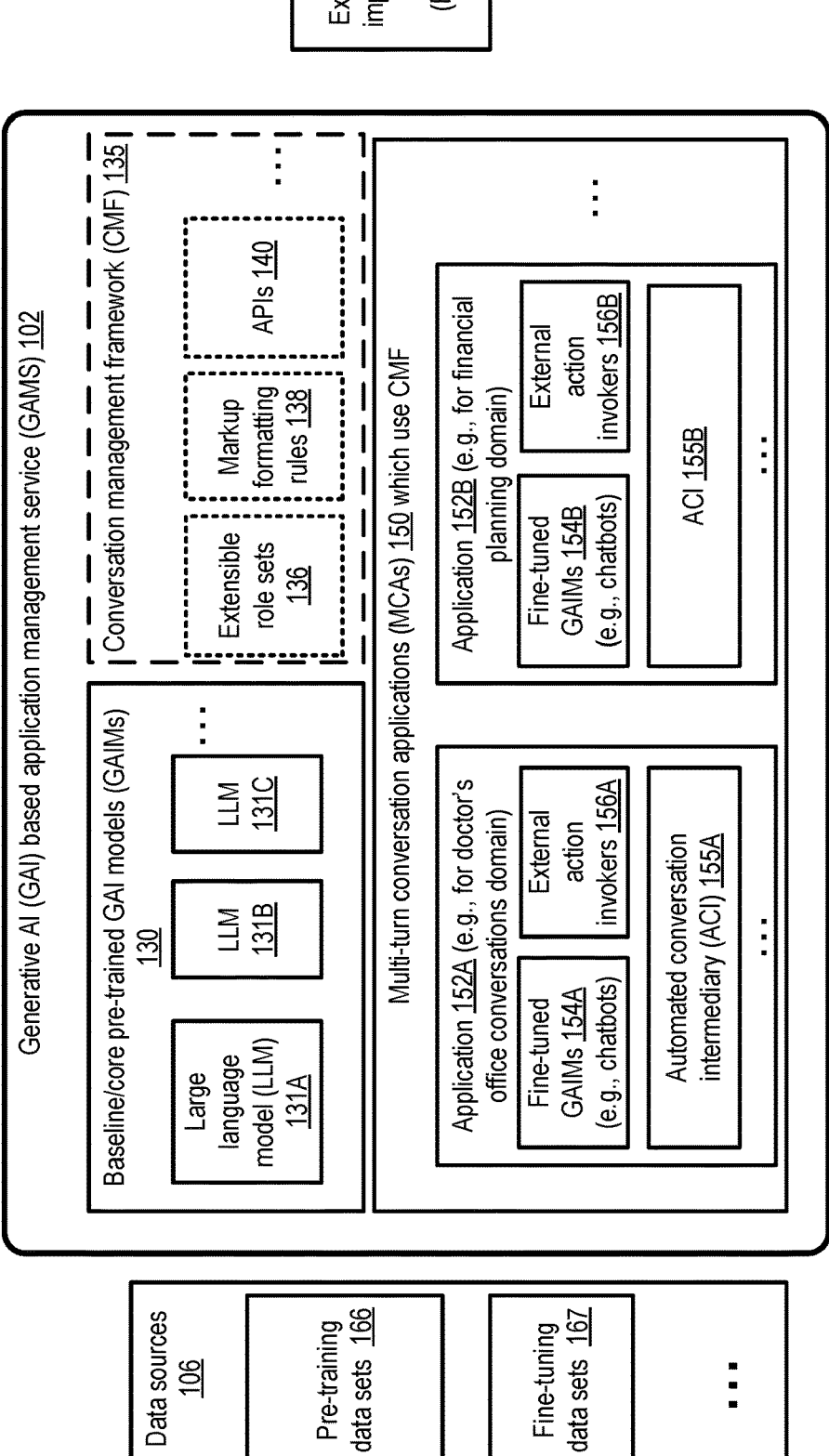
FIG. 1 illustrates an example system environment in which a conversation management framework may be implemented at a generative artificial intelligence (GAI) based application management service, enabling multi-turn multi-participant conversations to be conducted while providing structured input to the GAI models being used, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for expanding the kinds of conversations that can be conducted successfully with the help of GAI models, e.g., by enabling human and automated participants with numerous distinct conversation roles to be included in the conversations, and by introducing more structure into the prompts or context information provided to the GAI models. A conversation management framework (CMF) which supports extensible role sets for conversation-based applications in different problem domains may be provided, e.g., by a GAI-based application management service (GAMS) of a cloud provider network. For example, for a conversation conducted in a doctor's office or clinic, the set of roles may include a patient role, a doctor role, a doctor's (human) assistant role, and one or more types of chatbot roles. The CMF may also define an extensible set of hidden markers or tags which can be used to automatically annotate the prompts provided to the GAI models, thereby demarcating the portions of the prompt content that are contributed by various entities that have different roles in the conversations. The use of the CMF's hidden marker format for a variety of conversation-based applications or tasks may help GAI models to generalize better through knowledge transfer. The introduction of the hidden markers can have several other types of benefits, including enabling more focused embedding generation within the GAI models, and reducing the probability of success of certain types of attacks (such as prompt injection attacks) which may potentially be directed to the models during the conversations. The CMF may also include a set of application programming interfaces (APIs) which can be used by developers to design and implement automated conversation intermediaries (ACIs) of various types. Such ACIs can help coordinate the conversations, e.g., by annotating different portions of the prompt using the hidden markers, causing the execution of external actions needed for the conversations to proceed, verifying that the hidden markers are not exposed to the end users participating in the conversations, ensuring that end user input provided to the GAI models does not include hidden markers that the users themselves submitted (as opposed to hidden markers that the ACIs have introduced in accordance with the rules of the CMF), and so on.

In various embodiments, a given GAI model to be used for a conversation, such as a large language model (LLM), may first be pre-trained using a large corpus of input (which may comprise text and/or other modes of communication such as audio, video and the like). The pre-training, which for example enables the model to predict completions of input prompts based on its learning from the corpus, may be followed by a phase of fine-tuning of the model for a multi-turn conversation application. In at least some cases, the input data set used for the fine-tuning may comprise examples of conversation turns annotated in accordance with the CMF (including hidden markers and role information), enabling the model to learn about the different types of roles of entities that are expected to contribute to the conversations. The model may be trained to interpret hidden markers of the CMF, and also to include hidden markers to annotate the output it (the model) itself generates. As the model-generated output is also typically appended to the prompt and analyzed by the model as the conversation proceeds, such model-created annotations may be just as useful as ACI-created annotations. The model may also be trained to request invocations of external actions (e.g., to request that queries be sent to various databases, or commands be issued to run selected executable programs) and interpret the results of the external actions (which may also be annotated and added to the input prompt of the model).

After the model has been fine-tuned, it may be made available by a GAMS as a chatbot for conducting chats or conversations with one or more categories of end users (with each end user assigned a respective end user role in accordance with the CMF). An automated conversation intermediary (ACI) comprising one or more software programs may be deployed for coordination of such conversations, e.g., using resources (such as virtual machines or physical servers) of the GAMS. In some cases, at least some default ACIs may be made available for one or more types of conversations by the GAMS operator. Other ACIs may be generated by, and deployed at the GAMS at the request of, developers, e.g., using APIs of the CMF.

To initialize or prepare the chatbot (or chatbots) to be used in a conversation, the ACI may provide guidance to the chatbot via an annotated prompt section (e.g., using a "system" or "administrator" role and hidden prompts of the CMF). In such an initializing prompt portion, the ACI may indicate the general objectives or problem domain of the conversations that are to be conducted, and provide an indication of the external action implementation tools that may be invoked if needed by the chatbot. The ACI may then enable one or more human end users (each assigned respective CMF-defined roles) to start providing input to the chatbot. For each turn or step in the conversation, the ACI may annotate the end user input and add the annotated input to a dynamically growing prompt provided to the chatbot. The chatbot may generate various kinds of responses—e.g., some responses may be intended to invoke external actions, others may indicate natural language input to be provided for the end user(s), and so on. The chatbot may annotate the output it generates in various embodiments, using the CMF's defined roles and markers. Depending on the kind of output generated by the chatbot, the ACI may initiate various actions. For example, if the chatbot output comprises a request to invoke an external action (where the fact that it comprises such a request may be indicated via annotation generated by the chatbot), the action may be invoked, either by the ACI itself or via an automated agent associated with the kind of external action that was requested. If the chatbot output comprises natural language output to be presented to an end user, the ACI may strip the annotations from the output, verify that the stripped natural language output follows a set of rules of the CMF (e.g., that the natural language does not contain any examples of hidden markers, or follows certain content quality guidelines), and present the output to the end user for which it was intended. Input from the end users may also be screened based on CMF rules—e.g., if an end user appears to be attempting to include hidden markers of the CMF, or violates other input quality constraints defined for the application being implemented, the input may be rejected instead of passing it on to the chatbot.

In some cases, a chatbot may also generate output in the role of a chain-of-thought presenter. For example, the chatbot may indicate some intermediate steps in its reasoning, which may then be followed by other steps and actions before the next natural language output for an end user is generated. Such chain-of-thought reasoning information may be used by the GAMS to respond to requests for explanatory information about the output presented to the end users; in some cases, the chain-of-thought reasoning output may be provided to the end users without receiving a request for explanatory information. In some embodiments, after a given conversation is concluded, the human participants (end users) may provide feedback via GAMS programmatic interfaces, indicating for example their level of satisfaction with coherence and applicability of the chatbot output presented to them. Such feedback may indicate the perceived quality of the chatbots and may in some cases be used to further fine-tune the chatbots.

The conversation-based application may be augmented by adding roles over time. When a new role is added, in some cases an additional phase of fine-tuning with examples of the kinds of input an entity with the new role is expected to generate may be conducted, a new version of the ACI may be deployed, and/or additional guidance or instruction may be provided as part of the prompt to the chatbot or chatbots being used.

As one skilled in the art will appreciate in light of this disclosure, certain embodiments may be capable of achieving various advantages, including some or all of the following: (a) enabling richer and more complex conversations associated in a variety of problem domains to be conducted successfully between human users and chatbots or other GAI models, (b) increasing the robustness of GAI models with respect to attacks such as prompt injection attacks, and/or (c) providing better explanations of the reasoning used by GAI models during the conversations.

According to some embodiments, a system may include one or more computing devices. The computing devices may include instructions that upon execution on or across the one or more computing devices cause the one or more computing devices to deploy, using resources of a network-accessible generative artificial intelligence (GAI)-based application management service (GAMS), an automated conversation intermediary (ACI) for interactions among a set of conversation contributor entities. Individual ones of the conversation contributor entities may have respective sets of one or more pre-defined roles associated with multi-turn conversations between one or more chatbots and one or more end users. The different roles may be members of an extensible role set of a CMF, and may for example include (a) a first user category role, (b) a second user category role, (c) a natural language output source role (e.g., a role assumed and indicated using annotations by a chatbot when it generates a specific natural language sequence intended for an end user belonging to a specified category of user), (d) an external action invocator role (e.g., a role assumed and indicated by a chatbot when it generates request to implement or execute an external action needed to continue a conversation, i.e., an action that cannot be completed by the chatbot itself) and (e) an external action implementer role (a role of a program or tool invoked to satisfy a chatbot's request for an action). In the case of human end users, in some embodiments the humans may be required to indicate or specify (e.g., early on during the conversation) which role they are assuming in the conversation. In other embodiments, the chatbots or the ACI used may deduce the roles based on analysis of an initial set of natural language input from the end users. A given conversation contributor entity may assume different roles in different turns of a conversation—for example, a chatbot may assume the role of an external action invocator in one turn, and the role of a natural language output source in another turn.

The ACI may perform numerous operations or tasks to orchestrate or coordinate a particular multi-turn conversation between at least a first end user and a first chatbot in various embodiments. The first end user may, for example, have the first user category role (other users may have roles of other user categories). The operations performed by the ACI may include appending annotated sections to the prompt (annotated, for example, using role identifiers and hidden markers) of a chatbot as different conversation contributors complete their turns in some embodiments, and providing un-annotated natural language to the end user(s). The chatbots may consume the contents of the growing prompt and generate corresponding outputs in their turns. In at least some embodiments, the ACI may also be responsible for pruning or editing the prompt if/when the prompt size reaches a threshold; in such a scenario, the sections of the prompt which represent content associated with or generated by entities belonging to some types of roles may be removed from the prompt in preference to content associated with other types of roles. For example, content associated with external action-related roles may be deleted in preference to deleting natural language input provided by end users.

The operations performed by an ACI during the conversation may include intercepting the natural language input of the first end user (which may have been obtained using an API of the CMF) and annotating that input prior to providing it to a first chatbot as part of a prompt. The user input may be annotated, for example, by adding (a) an indication that the natural language input was obtained from an entity that has the first user category role and (b) at least a first subset of a collection of hidden markers of the CMF. In various embodiments, according to the rules of the CMF, the hidden markers of the collection may not be included in output provided to an end user during any given conversation. In at least some implementations, individual ones of the hidden markers may comprise respective bit sequences which do not correspond to Unicode encodings. The first subset of markers used to annotate the end user input may include, for example, a turn start marker, a role marker, and a turn end marker.

After the chatbot has processed the annotated natural language input originating at the first end user, in some embodiments the ACI may receive a first chatbot-generated token sequence. This sequence may include (a) an indication of a particular external action to be implemented by a particular external action implementer (b) an indication that the sequence was generated by an entity that has an external action invocator role, and (c) a second subset of the collection of hidden markers. The second subset may include the turn start marker, the role marker, the turn end marker, and an action invocation metadata marker. The metadata marker may indicate the position, within the token sequence, of metadata comprising additional information that may be associated with, or useful for, invoking the external action which is requested, such as whether permission/approval from some entity is needed as a prerequisite for the external action, a particular format in which the results of the action are expected, a timestamp at which the request for the external action was generated by the chatbot, sources of credentials/permissions needed for the action, the credentials themselves, etc.

In at least some embodiments, the ACI may obtain an action result token sequence corresponding to the action indicated in the chatbot-generated token sequence. The action results token sequence may, for example, comprise a result string generated by some program (referred to as an external action implementer) which attempted the action. Prior to appending the action result token sequence to the prompt, the ACI may annotate the action result token sequence with (a) an indication that the action result token sequence was obtained from an entity that has the external action implementer role and (b) a third subset of the collection of hidden markers, wherein the third subset includes the turn start marker, the role marker, the turn end marker, and an action result metadata marker. This metadata marker may, for example, demarcate the portion of the prompt which contains a status indicator (e.g., "success" or "failure") of the action, and/or a timestamp indicating when the action was completed or initiated by the entity with the external action implemented role.

The chatbot may process the annotated action result token sequence and generate a second token sequence in various embodiments. The second chatbot-generated sequence may for example include (a) a natural language response generated by the chatbot for the first end user (b) an indication that the second token sequence was generated by an entity that has a natural language output source role, and (c) a fourth subset of the collection of hidden markers which includes the turn start marker, the role marker, and the turn end marker. The ACI may then present an unmarked natural language response token sequence to the first end user in such embodiments. The unmarked natural language response token sequence may be generated at least in part by removing the fourth subset of hidden markers from the second chatbot-generated token sequence.

The use of the hidden markers may prevent prompt injection attacks from being successful in various embodiments—e.g., attempts by end users to mislead the chatbots into providing information which should not be exposed, or into changing the overall purpose/objective of the chatbots during the conversation, may be thwarted. As part of this effort, the ACI may screen both (a) natural language input of end users and (b) natural language output of the chatbots, intended for the end users, such that neither of these kinds of natural language contains any of the hidden markers. If the ACI receives or intercepts a set of end user natural language input and detects that the input includes at least one hidden marker defined by the CMF, the input may be rejected, and the conversation may be terminated in at least some embodiments. Similarly, if the ACI receives a particular token sequence from a chatbot during a conversation and detects that the natural language portion of the particular token sequence (i.e., the part of the token sequence which is to be presented to an end user after stripping out annotations generated by the chatbot) contains a marker defined by the CMF, the ACI may discard the token sequence without presenting any of its content to the end user. In one embodiment, instead of entirely rejecting the input from an end user if the input includes one or more hidden markers, the ACI may instead remove the hidden markers which were included by the end user, before annotating the input and provided the annotated input (which may include hidden markers added by the ACI) to the chatbot. Similarly, in some embodiments, if the chatbot includes hidden markers within natural language output intended for presentation to an end user, the ACI may remove those markers from the natural language output before presenting the natural language output to the end user. In one embodiment, in addition to removing such hidden markers within natural language token sequences (either natural language directed from an end user to a chatbot, or directed from the chatbot to the end user), the ACI may take other actions as well, such as logging the incidents of attempted inclusion of hidden markers, modifying other portions of the natural language which occur in proximity to the hidden markers, and so on.

Depending on the specifics of the application or use case, any of a variety of external tools or actions may be utilized, e.g., at the request of a chatbot, during multi-turn conversations. In some cases, the external action may be read-only, such as if a search engine, database, or other read-only data source is queried to obtain some information needed for the conversation to proceed. In some cases, the external action may involve mutation or writes, e.g., to modify some data stored at a transaction processing system. During some conversations, multiple external tools or actions may be invoked by a chatbot before generating a natural language response to end user input. For example, after receiving an ACI-annotated version of a natural language input token sequence provided by an end user, a chatbot may invoke external actions A1, A2 and A3 before generating a response output natural language token sequence for the end user. In some scenarios, depending on the specific types of actions and their interdependencies (if any interdependencies exist), the actions may be invoked in sequence. For example, if a result of A1 is to be included as part of the parameters used for invoking A2 in the above example, A2 may be invoked only after the result of A1 is obtained. In other scenarios, at least some of the actions may be invoked in parallel.

In some embodiments, the chatbot(s) used for a conversation may provide information about intermediate reasoning steps completed by a chatbot, e.g., prior to generating a natural language response to end user input during a particular turn. For example, an ACI may receive, subsequent to processing of some set of annotated natural language input of an end user (or subsequent to processing of a result of an external action) by the chatbot, a particular chatbot-generated token sequence indicating the reasoning step. Such a chatbot-generated token sequence may include (a) a description or statement indicative of a particular intermediate reasoning step completed by the chatbot (b) an indication that the chatbot-generated token sequence was generated by an entity that has a chain-of-thought reasoning presenter/indicator role of the CMF role set, and (c) another subset of the collection of hidden markers, including the turn start marker, the role marker, and the turn end marker. The ACI may in some cases append such an intermediate-reasoning token sequence to the prompt, and/or provide a version of the intermediate-reasoning token sequence (after removing the hidden markers) to an end user. In at least some embodiments, such reasoning information may be stored in a repository of the GAMS and used to respond to explanation requests from end users or application owners/developers. For example, an end user may submit a request for an explanation of one or more generated responses by a chatbot, and the intermediate reasoning token sequences may be retrieved and included in an explanation response.

As indicated above, the set of roles of contributors to conversations managed using a GAMS may be expanded in various embodiments, e.g., based on changing application needs. In response to determining that a particular role is to be added to the role set for additional multi-turn conversations of an application, any combination of a number of operations may be performed to adapt the system to the new role. For example, in some embodiments, an updated version of the ACI provided by developers may be deployed, which includes logic to detect and process conversation turns associated with the particular role. In at least one embodiment, one or more additional fine-tuning phases may be conducted for the chatbot or chatbots being used, and input provided to the chatbot(s) during the additional fine-tuning phases may include examples of conversation turns associated with the particular role. In at least one embodiment, the introduction of the new role may be accompanied by additional instructions or guidance being provided via the prompt to the chatbot(s) using the "system" or "administrator" role. New roles may for example include additional end user categories, chatbot roles, external action implementers, and/or multi-modal interaction handler roles (e.g., a role assigned to an entity that processes input in video format or audio format rather than text format).

FIG. 1 illustrates an example system environment in which a conversation management framework may be implemented at a generative artificial intelligence (GAI) based application management service, enabling multi-turn multi-participant conversations to be conducted while providing structured input to the GAI models being used, according to at least some embodiments. As shown, system 100 may include resources and artifacts of a generative AI based application management service (GAMS) 102, including a set of baseline/core pre-trained GAI models (GAIMs), and a collection of multi-turn conversational applications (MCAs) which utilize a conversation management framework (CMF) 135. The baseline pre-trained GAIMs 130 may for example include a variety of large language models (LLMs), such as LLM 131A, LLM 131B or LLM 131C, which can be used singly or in combination to implement a given MCA. Note that some GAIMs of the GAMS may not necessarily comprise language models in one embodiment. The CMF 135 may support extensible role sets 136 (for differentiating between respective types of human and/or automated conversation contributors) and include a set of markup formatting rules 138 (also referred to as a markup format or markup language) as well as a set of application programming interfaces (APIs) 140 which can be used by developers to design and implement their MCAs. One or more of the LLMs 131 may be pre-trained at the GAMS using large corpora of pre-training data sets 166 stored at data sources 106 in the depicted embodiment, and then fine-tuned using fine-tuning data sets 167.

The GAMS 102 may implement a variety of programmatic interfaces in the depicted embodiment, such as one or more web-based consoles, graphical user interfaces, command line tools as well as APIs. In at least some embodiments, the programmatic interfaces may be split into at least two categories: developer programmatic interfaces 177A, and end user programmatic interfaces 177B. The developer programmatic interfaces may be used, for example, by application developers to prepare, provide and/or request the deployment of automated conversation intermediaries (ACIs) for various MCAs, such as ACI 155A or ACI 155B. In at least some embodiments, the CMF may also define default ordering rules for some types of conversation turns—e.g., that a guidance/instruction turn by an entity with an administrator role is required before initiation of end user interactions, that at least one turn comprising GAIM-provided output has to occur between a turn in which an external action implementation resource (EAIR) being used for a conversation provides input and a turn in which natural language output is provided to an end user, and so on. In various embodiments, the developer programmatic interfaces may also be used by developers and/or application owners to query the GAMS about the CMF—e.g., to determine a baseline set of roles which can potentially be extended, to determine the types of markers that the ACIs need to be able to use, and so on.

The end user programmatic interfaces 177B may be used by end users to submit natural language input for the MCAs and to receive corresponding responses in the depicted embodiment. In some cases, customized end user programmatic interfaces may be used for respective MCAs—e.g., the developers of the MCA components such as ACIs may implement respective end user interfaces for their MCAs, instead of using generic end user programmatic interfaces made available by the GAMS.

An application developer may select one or more of the baseline GAIMs for a particular MCA, and fine-tune the baseline GAIM(s) for that MCA using resources of the GAMS in some embodiments. For example, application 152A may be intended to be used for conversations of the kind typically expected to occur between doctors, patients and a set of fine-tuned GAIMs 154A, while application 152B may be intended to be used for conversations pertaining to financial planning (e.g., between financial professionals, their clients and another set of fine-tined GAIMs 154B. The fine-tuned versions of the GAIMs that are used in conversations may be referred to as chatbots. For coordinating or orchestrating the steps of conversations, individual ones of the MCAs may comprise respective ACIs, such as ACI 155A for application 152A and ACI 155B for application 152B.

During at least some of the kinds of applications implemented with the help of the GAIMs, external actions, programs, or operations may be invoked (e.g., at the request of a GAIM participating in the conversation), e.g., using external action implementation resources (EAIRs) 130. Such actions may be referred to as "external" in depicted embodiment because that they are not performed using resources of the GAMS itself. In some cases, some or all of the external actions needed for a conversation to make progress may be invoked by the ACIs directly (e.g., by issuing a service request to a web-accessible service). In other cases, the applications may comprise external action invoker programs (which may also have been designed and prepared by the developers of the ACIs) such as external action invokers 156A or 156B. In effect, when a GAIM indicates that an external action is required during a particular stage of a conversation, the corresponding ACI may receive an action invocation request generated by the GAIM. The ACI may then either transmit a corresponding message or request to the appropriate EAIR, or send the message/request via an external action invoker. The response to the external action may be received (either directly at the ACI or via the external action invoker) and appended to the prompt or context information provided to the GAIM to enable the GAIM to prepare output for further turns of the conversation.

In the embodiment depicted in FIG. 1, an ACI of an MCA may act as a hidden hub of the conversation being conducted. An end user may not even be aware of the existence of the ACI. From the perspective of the end user(s), the conversation may be conducted simply between the end user(s) and the chatbot(s) of the application. However, natural language input provided by an end user may be annotated by the ACI before it is provided to a chatbot (or multiple chatbots) as part of the prompt or context of the chatbot. The annotation may, for example, indicate a role (e.g., "end user of category C1", "patient end user", "doctor end user", etc.) being played in the conversation by that end user. The role for which annotation is added by the ACI may be one of the roles of an extensible role set 136 being used for the application. The ACI may use hidden markers defined in the markup formatting rules 138 to indicate the position within the prompt at which the role is specified, the position within the prompt at which the turn of the end user begins, and the position within the prompt at which the turn of the end user ends. The markers may be referred to as "hidden" in various embodiments in that they are not shown or exposed to the end users, but are used extensively within the applications to help improve the coherence and relevance of responses presented to the end users. The hidden markers may demarcate various portions of the prompt or context information consumed by the chatbots, thus adding structure indicative of the semantics of the different portions of the prompt. The chatbots may be able to use the markers to better interpret and understand the significance of different sections of the prompt, instead of (for example) having to deduce which type of entity generated individual ones of the sections.

A given chatbot may examine the contents of the prompt and generate a token sequence based on analysis of the prompt. In at least some embodiments, the input provided to the chatbot during fine-tuning and/or during pre-training may include examples of conversation portions (relevant to the application for which a trained version of the chatbot is to be used) annotated with the hidden markers, so the chatbot may be able to interpret the hidden markers appropriately. Furthermore, in at least some embodiments, the chatbot may also have learned (e.g., during fine-tuning) to annotate its own generated output before sending it to an ACI. The annotation for a given turn of output generation may for example indicate the chatbot's specific role (also selected from among the roles currently defined in the extensible role set of the application) when generating the output. For example, a chatbot may have the role of "external action requester" if the output generated (which can include a function call string as required by some programming language or API, and hence may not comprise natural language as such) is intended to result in an invocation of an external action, and the chatbot may have the role of "natural language response source" if the output generated comprises natural language which is intended to be presented to an end user. The chatbot may add hidden markers indicating the role being played by chatbot with regard to the generated output, the start of the turn comprising the generated output, the end of the turn, and/or optional metadata which may be associated with an external action to be executed. The metadata may for example include a timestamp indicating the time at which an action was requested by the chatbot, credentials or sources of credentials which may be needed for the external action, whether permission from some entity is required for executing the action, and so on.

The ACI may receive the annotated chatbot-generated output and take appropriate action to enable the conversation to proceed in the depicted embodiment. If the chatbot-generated output requests the execution of an external action, the ACI may cause the action to be performed, e.g., by either directly issuing a command/request to an EAIR, or by using an external action invoker of the application. The result obtained from the EAIR may also be annotated by the ACI using hidden markers, and the annotated version may be appended to the prompt of one or more chatbots. The hidden markers and role information added by the ACI to the result or response token sequence of the action may indicate that the source of the token sequence has the role of "external action implementer." The positions of the start and end of the response token sequence, as well as the position of any optional metadata (such as a result status code, a timestamp indicating the time at which the request was fulfilled, etc.) may be indicated by hidden markers in the depicted embodiment. If the output generated by the chatbot comprises a natural language response intended for an end user (as indicated by the role annotation included by the chatbot in its output), the ACI may strip the hidden markers from the output and present the output to the end user for whom it was intended.

In various embodiments, the ACI may conduct at least two types of checks to enhance the overall security of the application, e.g., to reduce the probability of success of prompt injection attacks or other types of attacks. For incoming natural language received from end users, the ACI may verify that the natural language itself (i.e., prior to annotation) does not include any of the hidden markers. If a hidden marker is found, the input may be rejected and the conversation may be terminated in at least some embodiments, as this may represent an attempt by an end user to use the application in a manner which the application developers/owners did not attend the application to be used. For outgoing natural language presented to the end users, the ACI may similarly verify that the language does not include any hidden markers. If it does, the output may not be presented to the end users, as the presence of the hidden markers may indicate that the chatbot which generated the natural language is not functioning as intended. In some embodiments, to further enhance security, the hidden markers may be selected such that they comprise bit sequences which do not correspond to or match character encodings (such as Unicode encodings).

By introducing annotations of the kind introduced above into various portions of the prompt, additional semantic information about the contents of the prompt may be provided to the chatbots in various embodiments, relative to the information which would have been available had the annotations not been used. As a result, the overall quality of the chatbot responses may improve in such embodiments.

FIG. 2 illustrates an example extensible set of roles of entities contributing to a conversation conducted with the help of one or more GAI models, according to at least some embodiments. As various turns of a multi-turn conversation proceed, the context or prompt of the GAI models may be updated (e.g., by an ACI) with the set of tokens provided by the different human and automated entities contributing to the conversation in their turns. If the sets of tokens are simply appended to the prompt, without any specific indication of the types of sources from which the tokens were obtained, the GAI models may have to deduce the sources in order to generate the appropriate responses. In at least some embodiments in which a conversation management framework (CMF) of the kind introduced above is used, an extensible set of roles may be defined for individual conversation-based applications, and information about the roles of the different entities that contribute may be added to respective portions of the prompt. In one embodiment, the CMF may define a baseline set of roles which are by default available for all multi-turn conversations, and roles may be added by application developers as needed.

A set of roles which may be employed to differentiate the sources of different sections of a prompt may include one or more end user category roles 205. For example, for an application involving health-related conversations, a given end user participating in a given conversation may be classified as belonging to a patient category, a doctor category, a nurse category, a doctor's assistant category, and so on. For a finance-related conversation application, the end users may have roles such as finance professional, financial advice requester, and so on.

For some applications, multiple chatbots or GAIMs may be used—for example, one chatbot may provide high-level financial advice to a client of a financial application, while another may provide advice specific to a particular type of financial asset or a particular type of financial event (such as an inheritance). A number of different chatbot roles 207 may be defined for some such applications in the depicted embodiment.

As indicated earlier, external actions may be performed, e.g., at the request of a given chatbot participant, during some multi-turn conversations. When generating an output token sequence or string indicating that such an external action is to be performed, an indication that the token sequence is generated by an entity with an external action requester role 209 may be included (e.g., via annotations) in the token sequence. If several different types of external actions are needed for a given application, respective external action requester roles may be defined for each type of external action in some embodiments. Similarly, one or more external action implementer roles 211 may be defined in some embodiments for an application, indicating the specific programs or other entities which perform requested external actions. Action result token sequences (the outputs of the external actions) may be annotated, e.g., by an ACI prior to including the sequences in the chatbot prompt, to indicate the external action implementer role in some embodiments.

In some embodiments, a given chatbot or GAI model may reason in multiple steps (referred to as a chain of thought) about the context information it has obtained thus far in a conversation, before generating the final natural language output for the end users participating in the conversation.

Some of these intermediate reasoning steps may lead to invocation of additional actions, while others may simply summarize the current state of the chatbot's analysis. A chatbot may generate a respective output token sequence corresponding to one or more of the intermediate reasoning steps, and annotate such a sequence to indicate that it was generated by an entity which has a chain-of-thought reasoning indicator role 215 in one embodiment. The annotated output token sequence may itself be added to the prompt, and analysis of the chain of thought information may lead the chatbot to additional steps of reasoning in various embodiments.

In at least some embodiments, a chatbot may be provided (e.g., as part of its prompt) guidance, instructions or rules, expressed in natural language, about the manner in which the chatbot is to respond and/or the different types of external actions/tools which can be invoked at the request of the chatbot during a conversation. The prompt may be annotated to indicate that the guidance is being provided by an entity that has an application administrator or "system" role 217 in some embodiments.

For some applications, conversations may be multi-modal, in that multiple communication modalities or channels may be used—for example, the input from, or output provided to, an end user may include images, audio, video and the like and may not be restricted to text. For such applications, in some embodiments, a set of conversation multi-modality handling roles 219 may be defined, representing for example respective intermediaries for handling data in the different modalities. The contributions of such modality handlers to the conversation may be annotated within a chatbot prompt by indicating these types of roles. In some embodiments, combinations of roles other than those shown in FIG. 2 may be used for multi-turn conversation management in accordance with a CMF.

FIG. 3 illustrates an example extensible set of hidden markers which may be used to demarcate various portions of a prompt provided to a GAI model during a conversation, according to at least some embodiments. Such an extensible hidden marker collection 305 may be used, for example, to annotate the prompt provided to a GAIM such as a chatbot during the course of a conversation. Some of the tokens may be added to token sequences of various turns of the conversation by an ACI, while others may be added to token sequences (generated by a chatbot) by the chatbots themselves. The markers, which may also be referred to as tags or markup elements, may not be exposed to the end users participating in the conversations, or to external action implemented in various embodiments; as such, they may be used only by the components of the applications (such as chatbots, ACIs etc.) that are implemented at the GAMS. The markers may be used to structure the prompt content by distinguishing conversation elements which have different semantics from one another. They may also help to prevent (or reduce the probability of success of) prompt injection attacks. A prompt injection attack is an attempt to manipulate a chatbot or GAIM to provide outputs of a type that it was not intended to provide (e.g., revealing information that it was not intended to reveal, such as details of its inner logic, or potentially sensitive information about other end users), by adding malicious content to the prompts. By in effect encapsulating content using the hidden markers before adding it the prompt, and screening end user input to make sure it does not itself include such markers, the likelihood of successful attacks of this kind can be reduced substantially in various embodiments. The output generated for end users by the chatbot may also be screeded by ACIs to ensure that information about the hidden markers, or the hidden markers themselves, are not provided to the end users in various embodiments.

The collection of hidden markers for a given application implemented at a GAMS may include, among others, a conversation turn start (TS) marker 302, a conversation turn end (TE) marker 304, an entity role (ER) marker 306, an external action request metadata (ARQM) marker 308, and an external action response metadata (ARSM) marker 310 in the depicted embodiment. The graphical symbols (such as the gear symbol for the ARQM marker) shown in FIG. 3 are intended to indicate that the markers may in at least some cases comprise bit sequences that do not correspond to or encode natural language characters themselves—e.g., a given hidden marker may be represented by a bit sequence which does not correspond to the Unicode encoding of any given character(s) or symbol(s) that would typically be used in natural language interactions. Note that in practice, in various embodiments graphical symbols of the kind shown in FIG. 3 may not be added to the chatbot prompts; the symbols are shown in FIG. 3 simply to emphasize that the hidden markers do not correspond to the kinds of natural language elements that would normally be used in conversations. Additional types of markers may be added to a baseline marker collection defined at a CFM of a GAMS in some embodiments, e.g., based on programmatic input from application developers. If and when a new marker is added, the chatbots that are expected to use or interpret the new markers may be fine-tuned accordingly, and/or new versions of ACIs may be developed which can annotate prompts using the new marker.

FIG. 4A, FIG. 4B, FIG. 4C and FIG. 4D collectively illustrate an example multi-turn conversation between an end user and a GAI model, according to at least some embodiments. A relatively simple example conversation is shown to illustrate the concepts involved; for example, only a single end user category participates in the example, a single chatbot is used, and only a single type of external action is performed during the conversation. In practice, a given conversation may involve multiple categories of end users, multiple types of external actions, and/or multiple chatbot participants.

A prompt 401 of an LLM 406 being used as the chatbot for a multi-turn conversation may comprise text tokens and hidden markers of the kind introduced above in the depicted embodiment. As the conversation proceeds, the prompt may be appended with additional combinations of tokens and markers representing the turns of the conversation, and as such may represent the growing work history or chat history of the conversation. An annotated representation of a tool description turn 402 may be included at the start of the prompt, e.g., by an ACI of the kind introduced above, prior to initiation of a conversation with an end user. Hidden markers belonging to the example marker collection of FIG. 3 are used in FIG. 4A, FIG. 4B, FIG. 4C and FIG. 4D. In the section of the prompt corresponding to tool description turn 402, the start of the turn is indicated by the turn start (TS) marker, the end of the turn is indicated by the turn end (TE) marker, and the position of the "system" role identifier is indicated by the entity role (ER) marker. The content of the turn after the ER marker. In the natural language portion of turn 402 (the portion between the ER marker and the TE marker), the LLM is instructed about the available external actions which can be performed to assist the end user; a timestamp indicating when the instruction is provided is also included.

The overall objective of the LLM in the conversation (helping end users with weather forecast information in the example shown) is provided in the guidance/instruction turn 403 of FIG. 4A. The TW, ER and TE markers are also used, and the LLM is informed that the guidance is being provided by an entity with the "system" role.

An end user belonging to a particular category referred to as Category A is permitted to start a conversation with the LLM 406. The natural language input provided by the end user in the first end user turn 404 is "Is it going to rain in <City-C1> tomorrow?" The ACI annotates the input before adding it to the prompt, indicating the Category A User role of the end user, and adding the TS, TE and ER hidden markers.

LLM 406 analyses the prompt contents and produces LLM generated output 408. Note that this output 408 already includes hidden markers that the LLM has learned to introduce into its own output (e.g., during fine-tuning and/or during pre-training). In the example shown, the LLM requests the invocation of an external action implementer tool called "WeatherTool". The output 408 includes an indication that an entity with an external action requester role is the source of the output. A function execution string beginning with "WeatherTool.get" is generated by the LLM to obtain requested weather information. The output 408 includes the TS, ER, TE and ARQM hidden markers, with the ARQM marker being used to indicate the portion of the output which represents metadata that may be associated with the invocation of WeatherTool.

The requested action is initiated by an action invoker 410 (e.g., the ACI, or some other intermediary for external actions) by sending the invocation request to an external action implementation resource (EAIR) 411 such as a web site or program in the depicted scenario. The EAIR performs the requested action, and sends back EAIR-generated output 412, comprising a machine-readable response to the query about City-A's weather.

Figure 4B:
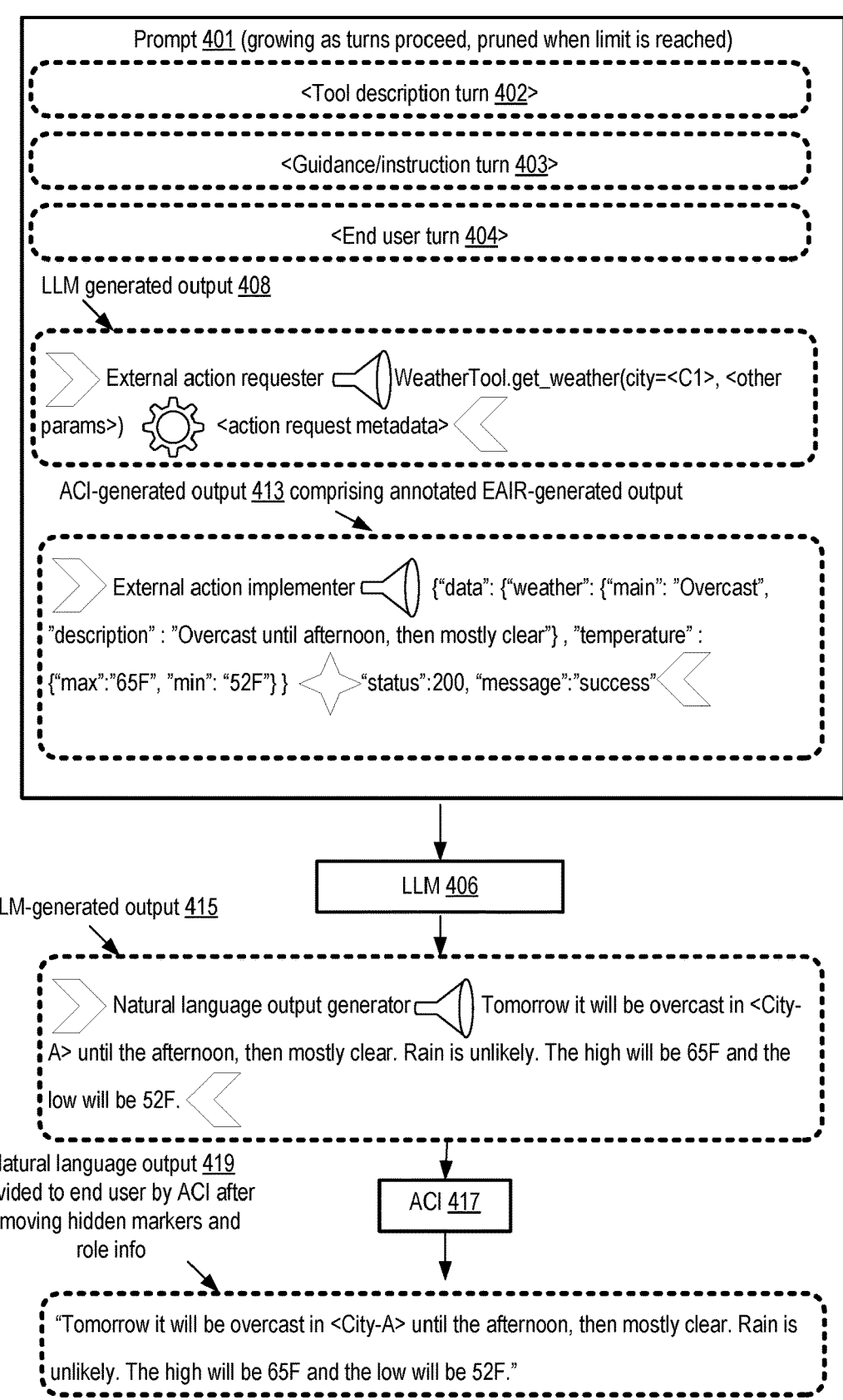

FIG. 4B shows a subsequent version of the prompt 401, after the LLM-generated output 408 and EAIR-generated output is appended to the prompt. Note that the prompt still retains the annotated tool description turn 402, the guidance/instruction turn 403 and the end user turn 404, the contents of all of which were shown in FIG. 4A. The LLM-generated output 408 does not require any additional annotation by the ACI in the depicted example, as it was provided by the LLM with annotations already added. The output which was provided by the EAIR is annotated by the ACI before it is inserted in the prompt, as indicated in the portion of the prompt labeled ACI-generated output 413 comprising annotated EAIR-generated output. The annotations introduced by the ACI indicate that an entity with the role "external action implementer" has produced the string which starts with "data". The ARSM marker is used to indicate a status code (200) and a result message ("success") corresponding to the result of invocation of the WeatherTool.get function in the depicted example.

The LLM consumes the version of the prompt indicated in FIG. 4B and produces LLM generated output 415 after analysis of that version. The output 415 indicates that an entity with the role "natural language output generator" has produced the token sequence starting with "Tomorrow" and ending with "52F". The indication of this role informs ACI 417 that the content of the output 415 (after it has been stripped of role information and hidden markers) is to be presented to the end user. Accordingly, ACI 417 presents the natural language output 419 to the end user who had initially submitted the prompt in end user turn 404.

Over time, the prompt 401 may grow as more turns occur and as annotated representations of those turns are appended to the prompt. At some point, a threshold size may be reached at which the prompt may need to be pruned, e.g., because the LLM 406 was trained with prompts of no greater than the threshold size, or because processing larger prompts than the threshold size may take too much time at the LLM. In at least some embodiments, the ACI may prune the prompt selectively when such thresholds are reached. For example, those portions of the prompt which represent natural language input (e.g., end user turn 404) or natural language output (e.g., the annotated LLM-generated output 415) may be retained, while sections of the prompt corresponding to other roles may be pruned first.

Figure 4C:
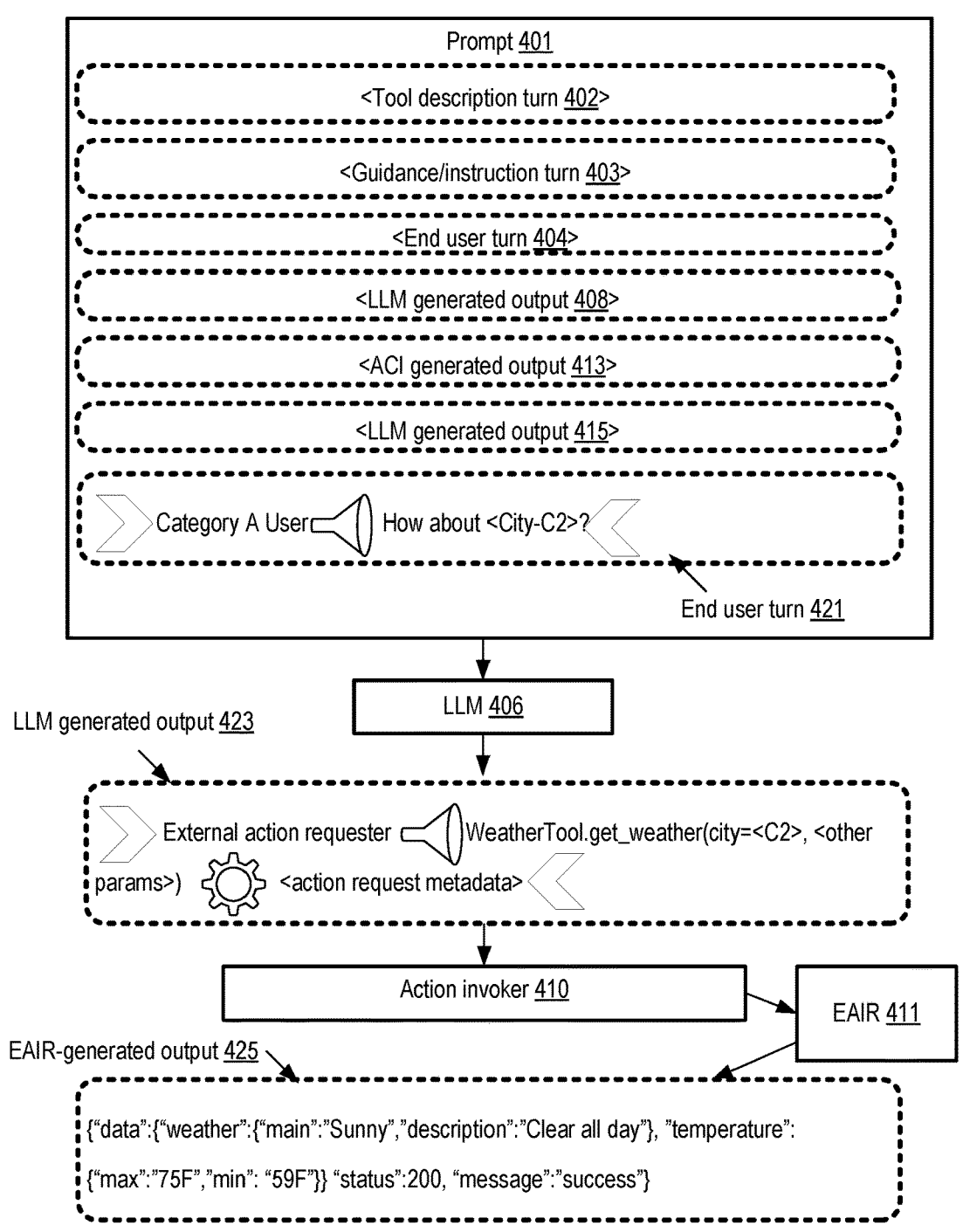

FIG. 4C shows a subsequent state of the prompt 401, after the natural language output regarding the weather of City-A has been presented to the end user. In this state, the prompt now includes tool description turn 402, guidance/instruction turn 403, end user turn 404, LLM generated output 408, ACI generated output 413, and LLM generated output 415. After examining the information about the weather in City C1, the end user has decided to submit a query pertaining to the weather in a different city, City-C2 (e.g., the end user has entered the sentence "How about <City-C2>?" into the user interface of the application which comprises the LLM 406 and the ACI. An annotated version of the end user's new input is added to the prompt by the ACI, in the form of end user turn 421.

In response to the new end user input turn, the LLM requests the invocation of the WeatherTool again, this time specifying city C2 instead of C1. The LLM generated output 423 requesting this invocation is similar to the LLM generated output 408 shown in FIG. 4A. An action invoker 410 sends the request for the external action to EAIR 411 and gets back EAIR-generated output 425 comprising the prediction for City C2's weather.

Figure 4D:
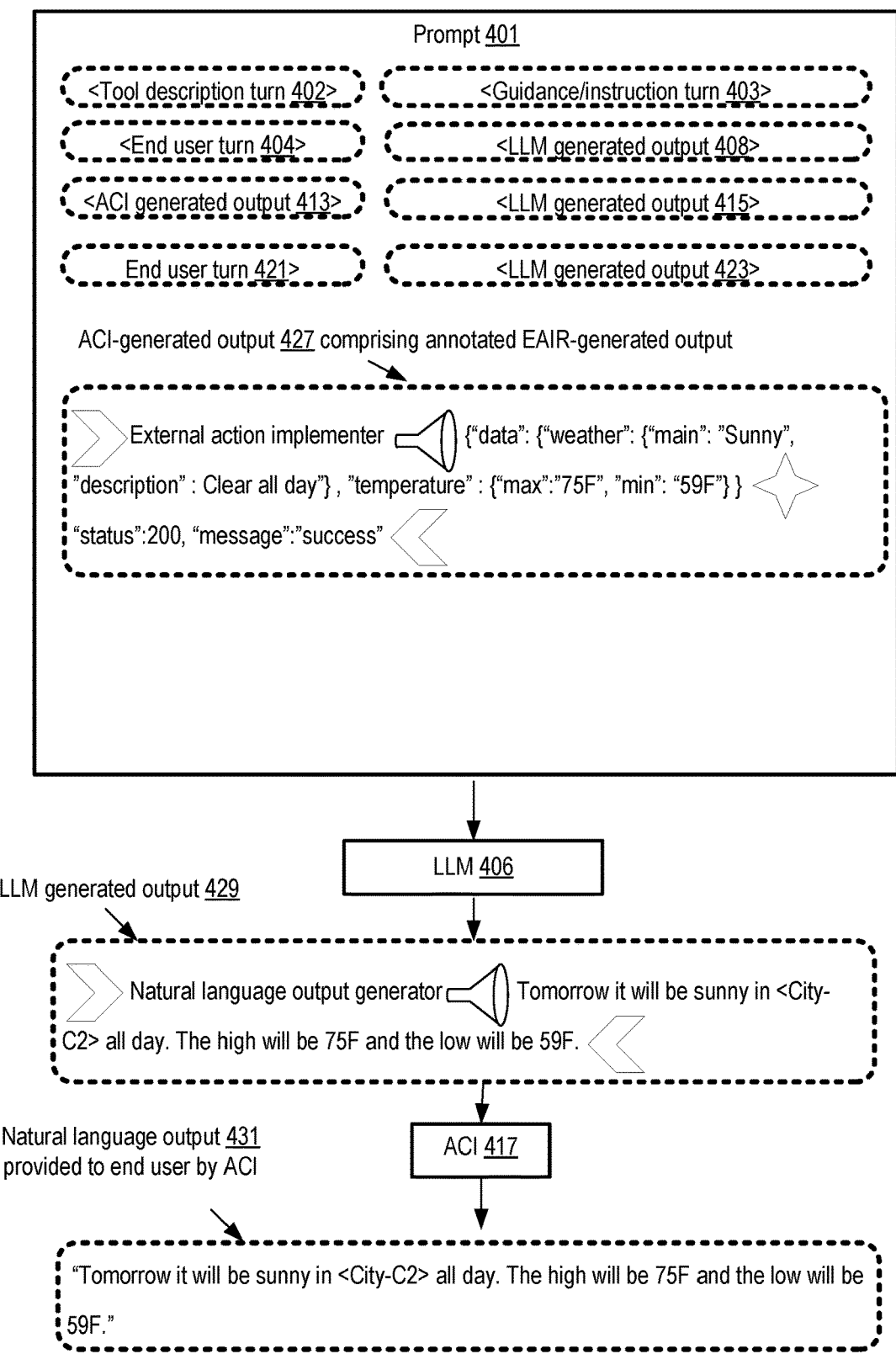

FIG. 4D shows a subsequent state of prompt 401, after the ACI has added (a) the end user turn 421, (b) the LLM generated output 423 and (c) the annotated ACI-generated version 427 of EAIR-generated output 425 to the prompt. After analyzing this version of the prompt, the LLM generates the next turn of natural language output for presentation to the end user. This LLM generated output 429 may be modified by the ACI 417 to remove the hidden markers, and the unmarked natural language output 431 may be presented to the end user.

FIG. 5 illustrates an example of reasoning step output which may be generated by a GAI model during a conversation, according to at least some embodiments. In the example scenario shown, a set of turns 802A of a multi-turn conversation of an end user with an LLM which has been fine-tuned for providing advice regarding financial planning has already been completed. Based on its analysis of the prompt contents which have been generated thus far (including CMF-based annotations similar to those discussed above), the LLM may generate a set of output indicating its current state of reasoning, one or more steps or prompt portions that may have led it to that current state, and/or one or more steps that it intends to take next to proceed with the conversation. As the LLM processes additional sections which may be added to the prompt (e.g., based on responses to external actions requests which were initiated based on the previous state of the LLM's reasoning), it may generate additional output indicating additional reasoning steps. Collectively, such LLM-generated sections of output may be referred to as chain-of-reasoning or chain-of-thought output, as they represent successive stages of analysis/reasoning and intermediary conclusions reached by the LLM.

In the financial planning-related scenario of FIG. 5, LLM-generated output 825 may, for example, comprise a description of a particular thought or reasoning step, in which the LLM indicates that it (the LLM) is considering two time frames regarding the retirement of the end user for which the financial advice is being provided: one "next year", and one "at age 65". The output 825 may include an indication that the source of the output has a "reasoning step indicator" role, and may comprise hidden markers (the TS marker, the TE marker, and a role marker).

The chain-of-thought output may be added to the prompt of the LLM by the ACI in the depicted embodiment. In addition, in some embodiments, such chain-of-thought reasoning information may also be stored (after removing hidden markers and role information) in a repository of explanatory information. The saved reasoning information may be used to provide explanations 829 of subsequent portions of LLM output, e.g., in response to programmatic requests for explanations from the end user or from other entities such as the application owner. Such reasoning information may also be used to evaluate the LLM performance in some embodiments, e.g., by human evaluators such as developers or application owners, or other LLMs. In one embodiment, the natural language portion of the output 825 may also be presented to an end user at the time it is generated, enabling the end user to react or respond if desired, or simply to make the end user aware of the reasoning of the LLM thus far (and to inform the user that some progress is being made in the effort to prepare a response to the end user's input). An additional set of conversation turns 802B may occur after the LLM produces output 825 in the depicted embodiment, e.g., potentially including invocations of external actions based on the reasoning described by the LLM, and/or turns of the kind discussed earlier.

Figure 6:
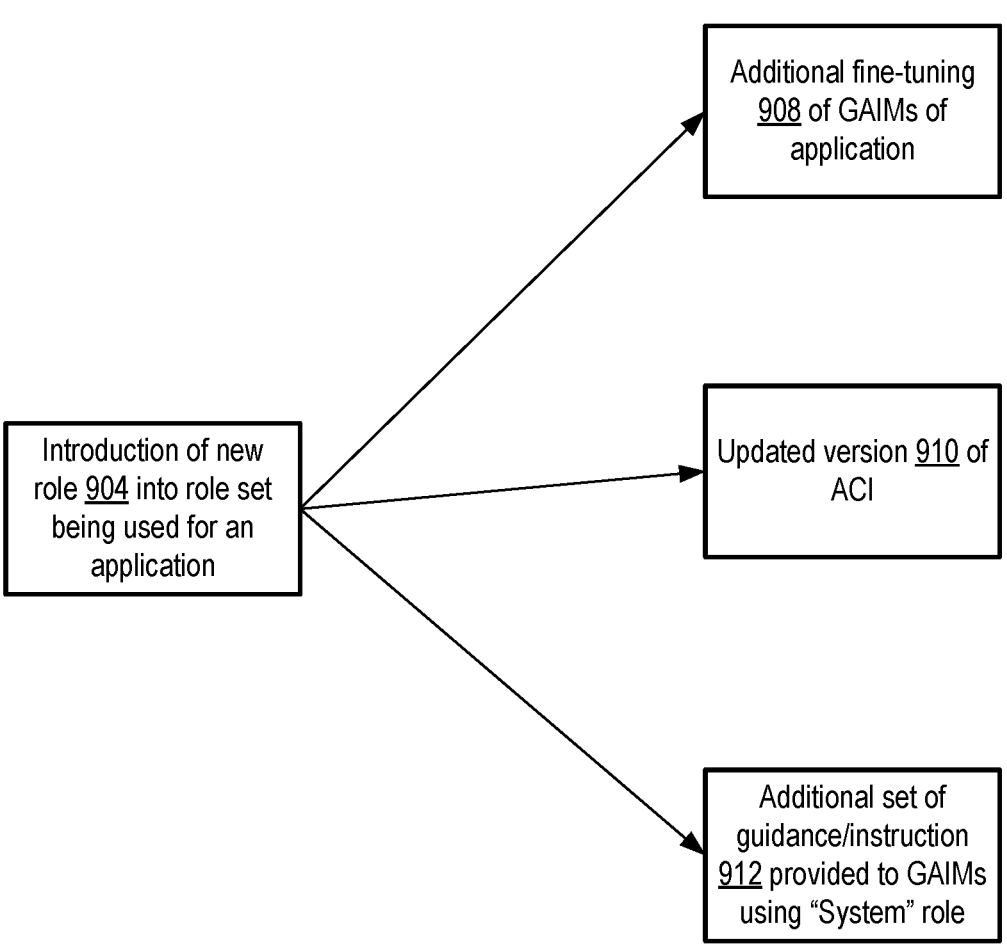
FIG. 6 illustrates example operations which may be performed to expand a role set being used for a conversation-based application, according to at least some embodiments.

FIG. 6 illustrates example operations which may be performed to expand a role set being used for a conversation-based application, according to at least some embodiments. In the embodiment shown in FIG. 6, an initial role set may be used for some period for a conversation-based application conforming with a CMF of the kind shown in FIG. 1. Then, the developer or owner of the application may decide that the application may benefit from the addition of a new role for subsequent conversations—for example, in the case of a healthcare-related application, the role of a caregiver end user that accompanies the patient during a conversation in a doctor's office may be added.

The application may be adapted to the introduction of the new role 904 using any combination of several types of approaches in the depicted embodiment. In one such approach, additional fine-tuning 908 of the GAIM or GAIMs being used may be conducted, e.g., using synthesized examples (with added annotations indicating the new role) in which an entity with the new role is participating in the conversation. Such fine-tuning may enable the GAIMs to reason more effectively and more quickly about the new role than if no additional fine-tuning were performed. An updated version 910 of the ACI may be prepared and deployed in some embodiments to annotate the contributions of entities with the new role. As such, the new version of the ACI may include logic to detect/identify and process conversation turns associated with the newly added role. Note that at least in some implementations, one or more end users may explicitly indicate their roles, e.g., when they begin conversing with the GAIMs. Automated participants such as multiple LLMs and/or multiple EAIRs may be assigned roles before the conversations with end users begin. In at least one embodiment, an additional set of guidance/instruction 912 may be provided to the GAIM(s), using a "system" role of the kind shown in FIG. 4A, informing the GAIM(s) about the added role and how entities with the new role are expected to contribute to the conversations. In some cases, depending on the application, information about new external action implementation resources (EAIRs) which may be useful in responding to input from entities with the new roles may be provided to the LLM using the "system" role. Other types of operations than the example shown in FIG. 6 may be performed in some embodiments to enable the LLM to adapt to the introduction of new roles.

FIG. 7 is a flow diagram illustrating aspects of operations pertaining to multi-turn conversations in which GAI models are provided structured prompts which include role information and hidden markers, according to at least some embodiments. As shown in element 1001, details or descriptions of various features of a conversation management framework (CMF) of a GAMS may be provided, e.g., to developers or owners of conversation-based applications via programmatic interfaces of the GAMS. The features may be used to handle or conduct multi-turn, multi-entity and/or multi-modal conversations with GAIMs, and may for example include a default role set for conversation contributors, a default collection of hidden markers to be used for annotating portions of GAM prompts, a set of APIs, turn sequencing rules and the like.

An automated conversation intermediary (ACI) (e.g., comprising one or more programs) may be deployed using resources of the GAMS for conducting conversations of a particular conversation-based application CA1 associated with a problem domain (element 1004). The CA1 may for example be prepared by developers using the CMF, and/or deployed in response to programmatic input from the developers in some embodiments. At least some conversations of CA1 may require the use of external action implementers to make meaningful progress—for example, search engines or other read-only data sources may need to be consulted, or operations comprising writes/mutations at transaction processing systems may need to be performed.

The ACI may provide guidance or instructions, including for example an initial set of information about feasible/permitted external actions, to a GAIM (e.g., an LLM-based chatbot) which has been pre-trained and then fine-tuned for CA1 in the depicted embodiment (element 1007). In some cases, during the fine-tuning, the GAIM may learn about additional roles of conversation contributors, beyond those in the default set of roles, and/or about additional types of hidden markers. In some cases, the ACI may also be designed to enforce additional types of constraints on the input that end users are permitted to provide, and/or on the output that can be presented to the end users. Such constraints may for example attempt to avoid the flow of undesired/exploitative language and the like. The guidance or instructions may provide an indication of the overall objectives intended to be achieved in the conversations of CA1 to help end user participants during the conversations. Conversations with end users may then be permitted to begin.

As end users provide natural language (NL) input during various turns of the conversation, the ACI may (a) verify that the NL input does not include any hidden markers and satisfies any other input constraints of CA1 and (b) annotate the NL input with hidden markers such as markers indicating the start and end of the end user's turn as well as the role of the end user (element 1010). The annotated NL input may then be added to the prompt of the GAIM.

The GAIM may process the prompt content and generate its own output at various turns of the conversation (element 1013). The GAIM-generated output may be processed by the ACI initially. During its turns, the GAIM may, for example, generate already-annotated output (i.e., output which already includes the appropriate hidden markers) intended for any of several purposes. The purposes may include, for example, (a) presentation of a natural language response to an end user, (b) a request to invoke an external action, or (c) an indication of a chain-of-thought reasoning step of the GAIM. Corresponding to each of these types of output, the GAIM may indicate a role, via an annotation, which the GAIM happens to be playing in a given turn—e.g., a role of "natural language output generator" may be indicated in the case where the GAIM has prepared output for an end user, a role of "external action implementer" may be indicated in the turn in which an external action is requested, or a role of "chain-of-thought reasoning indicator" may be indicated in a turn in which reasoning information is being provided.

Upon obtaining any of these types of GAIM-generated output, the ACI may perform the appropriate actions depending on the role indicated by the GAIM. For example, in the case in which NL output to be presented to the end user, the ACI may strip off the hidden markers, verify that the NL output itself does not contain any indication of hidden markers or violate any other output constraints of CA1, and present the extracted NL to the end user. In the case where the GAIM is requesting invocation of an external action, the ACI may cause the actions to be performed, and annotate the results obtained (also using hidden markers) before adding them to the prompt of the GAIM for further processing. The annotated output generated by the GAIM may itself also be added to the prompt.

If/when the prompt (which may also be referred to as the context of the GAIM) reaches a threshold size, it may have to be pruned (element 1016). The ACI may perform the pruning in some embodiments—e.g., by removing the portions of the accumulated prompt corresponding to some roles while leaving portions corresponding to other prompts in the prompt. In one such embodiment, sections of the prompt corresponding to roles other than end user roles and GAIM NL output generator roles may be removed in one embodiment. It is noted that in various embodiments, some of the operations shown in the flow diagram of FIG. 7 may be implemented in a different order than that shown in the figure, or may be performed in parallel rather than sequentially. Additionally, some of the operations shown in the flow diagram may not be required in one or more implementations.

Figure 8:
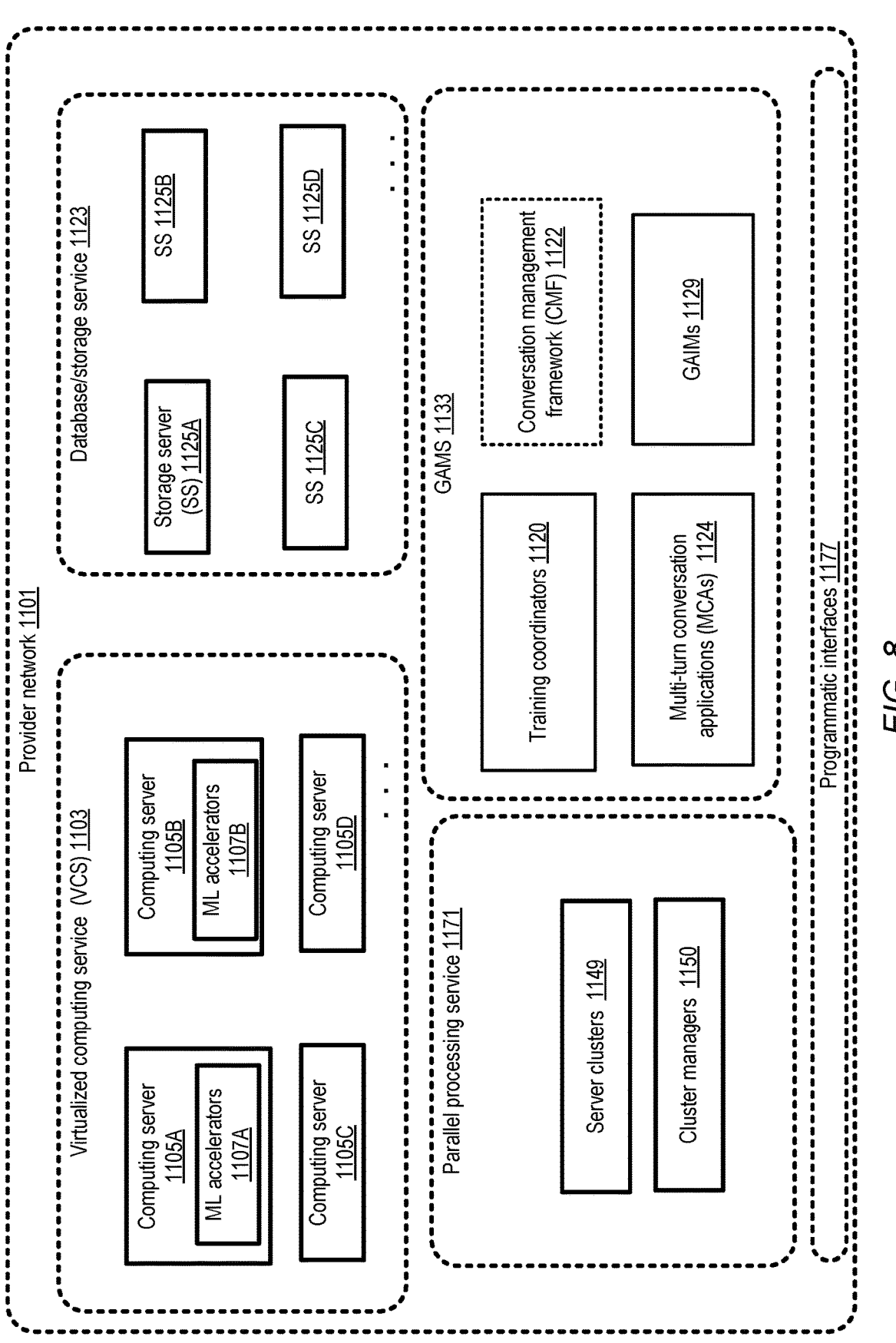
FIG. 8 illustrates an example provider network which includes a GAI-based application management service, according to at least some embodiments.

As indicated earlier, in some embodiments conversation management techniques of the kind introduced herein may be implemented at a cloud provider network or cloud computing environment. FIG. 8 illustrates an example provider network which includes a GAI-based application management service, according to at least some embodiments. In the depicted embodiment, provider network 1101 may comprise resources used to implement a plurality of network-accessible services, including for example a virtualized computing service (VCS) 1103, a database/storage service 1123, a parallel processing service 1171, and a GAMS 1133. The GAMS, similar in features and functionality to GAMS 102 of FIG. 1, may include training coordinators 1120 and a collection of multi-turn conversation applications 1124 implemented using GAIMs 1129 and a conversation management framework 1122 in the depicted embodiment. The training coordinators may be responsible for pre-training and fine-tuning the GAIMs. In some embodiments, the GAMS may be implemented within a more general machine learning service of the provider network 1101.

The VCS may comprise a plurality of servers (e.g., servers 1105A, 1105B, 1105C or 1105D) in the depicted embodiment. Respective groups of compute instances or virtual machines may be run on individual ones of the computing servers at the request of provider network clients. At least some of the servers may include a set of machine learning accelerators (MLAs) such as 1107A or 1107B, which can be used for training models and/or executing models. The MLAs may include graphics processing units (GPUs) in some embodiments, or custom chipsets designed for machine learning computations. The large data sets which may be used for pre-training GAIMs may be stored using storage servers (SSs) of database/storage service 1123, such as SS 1125A, 1125B, 1125C or 1125D. In some cases, distributed training or distributed data pre-processing tasks for some GAIMs may be performed using server clusters 1149 of the parallel processing service 1171, with the execution of the parallel tasks being orchestrated with the help of cluster managers 1150 in the depicted embodiment. Components of a given service of a provider network may thus in general utilize components of other services in the depicted embodiment. Individual ones of the services shown in FIG. 8 may implement a respective set of programmatic interfaces 1177 which can be used by external and/or internal clients (where the internal clients may comprise components of other services) in one embodiment. In at least some embodiments, resources of a cloud provider network may not be required for the kinds of techniques introduced above; instead, for example, a standalone set of resources may be used.

A cloud provider network 1101 can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. The compartmentalization and geographic distribution of computing hardware enables the cloud provider network to provide low-latency resource access to customers on a global scale with a high degree of fault tolerance and stability.

A VCS of the cloud provider network may offer virtual compute instances (also referred to as virtual machines, or simply "instances") with varying computational and/or memory resources in various embodiments, which may be used to implement components of a GAMS or to perform distributed training of GAIMs. In one embodiment, each of the virtual compute instances may correspond to one of several instance types, families or categories, and instances of any of several families may be employed for computations of the MLS. An instance type may be characterized by its hardware type, computational resources (e.g., number, type, and configuration of central processing units (CPUs) or CPU cores, GPUs, ML accelerators or hardware accelerators for other types of tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the GAMS, may broadly be subdivided into two categories in various embodiments: control plane operations and data plane operations. While the data plane represents the movement of customer application data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 9:
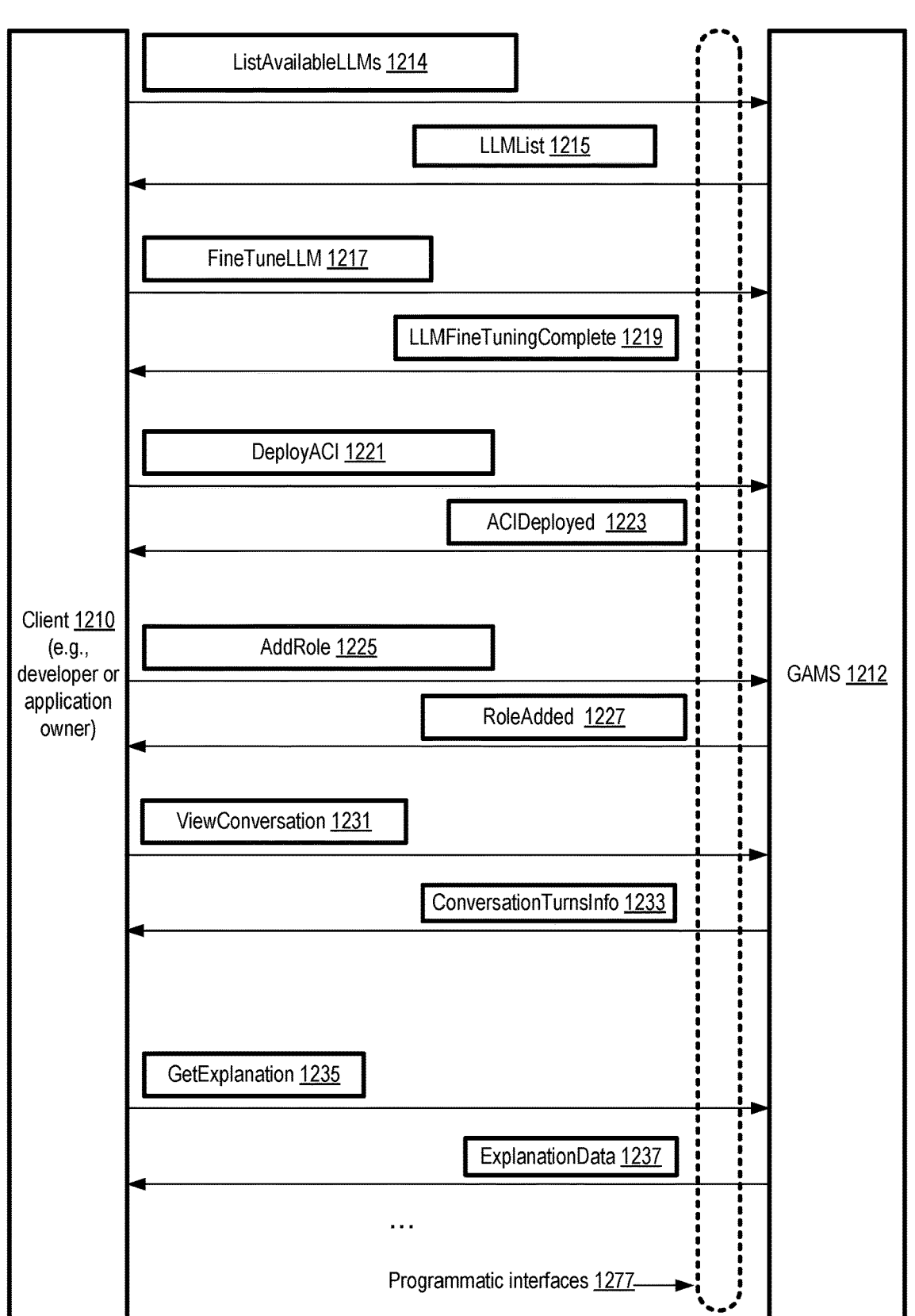
FIG. 9 illustrates examples of programmatic interactions between clients and a GAI-based application management service, according to at least some embodiments.

FIG. 9 illustrates examples of programmatic interactions between clients and a GAI-based application management service, according to at least some embodiments. A GAMS 1212, similar in features and functionality to GAMS 102 of FIG. 1, may implement a set of programmatic interfaces 1277 in the depicted embodiment, such as one or more web-based consoles, command-line tools, graphical user interfaces and/or APIs. Clients 1210 (e.g., developers or owners of conversation-based applications which use GAIMs) may utilize the programmatic interfaces to submit requests and information pertaining to their applications, and receive corresponding responses. The GAMS may provide numerous pre-trained GAIMs such as LLMs in the depicted embodiment, which can be fine-tuned as needed for the applications at the request of the developers. A ListAvailableLLMs request 1214 may be submitted by a client 1210 to obtain information about the available pre-trained LLMs of the GAMS, and a list of such LLMs may be provided to the client in a LLMList response message 1215 in the depicted embodiment. A client may submit a FineTuneLLM request 1217, specifying for example a fine-tuning training data set which includes examples of the conversation contributor entity roles and hidden markers that the developer's application is going to use, and specify a particular LLM which is to be fine-tuned. The specified LLM may then be pre-tuned using resources of, or VCS resources managed by, the GAMS, and an LLMFineTuningComplete message 1219 may be sent to the client in some embodiments.

A client may request deployment of a given version of an automated conversation intermediary (ACI) for an application using an LLM of the GAMS by submitting a DeployACI request 1221 in some embodiments. The ACI may be deployed at resources selected by the GAMS, and an ACIDeployed message 1223 may be sent to the client. If and when the client wants to extend the entity role set of an LLM-based application for which an ACI was deployed earlier, an AddRole request 1225 may be sent to the GAMS. In at least some embodiments, the AddRole request may indicate a fine-tuning data set that includes training examples pertaining to the role which is to be added, and/or a new version of the ACI which is capable of processing conversation turns associated with the new role (or providing guidance about the new role to the LLM being used for the application). Operations needed to adapt the application to the new role may be performed at the GAMS (e.g., additional fine-tuning may be conducted on the LLM, and/or a new version of the ACI may be deployed), and a RoleAdded response message 1227 may be sent to the client.

In at least one embodiment, for debugging and analysis purposes, respective records may be stored at a GAMS for various conversations which were conducted using one of the applications being run using the GAMS. In such embodiments, the end users who participate in the conversations may be asked to opt-in to such records, and the records may only be created and stored if the end users agree. The record of a given conversation may for example include representations of the various turns of the conversation contributors (including role information and/or hidden markers), records of the pruning actions (if any) that were taken if the prompt size of an LLM used in the application reached a threshold, and so on. A client may submit a ViewConversation request 1231 via programmatic interfaces 1277 in the depicted embodiment to view a record of a conversation. The information stored by the GAMS for that conversation may be provided via one or more ConversationTurnsInfo messages 1233 in the depicted embodiment.

In some cases, a client may wish to obtain an explanation for some portion of output produced by an LLM during a conversation, e.g., a conversation whose record was viewed by the client. A GetExplanation request 1235 may be submitted in some embodiments to obtain the explanation. The GAMS may analyze the turns of the conversation and provide explanatory information via one or more ExplanationData messages 1237 in the depicted embodiment. The explanatory information may include chain-of-thought reasoning turn content of the kind described earlier, in which an LLM may have provided information about intermediary reasoning steps which led to the output for which the explanation was requested. It is noted that in some embodiments, programmatic interactions other than those shown in FIG. 8 may be supported by a GAMS for conversation-based application-related operations.

Figure 10:
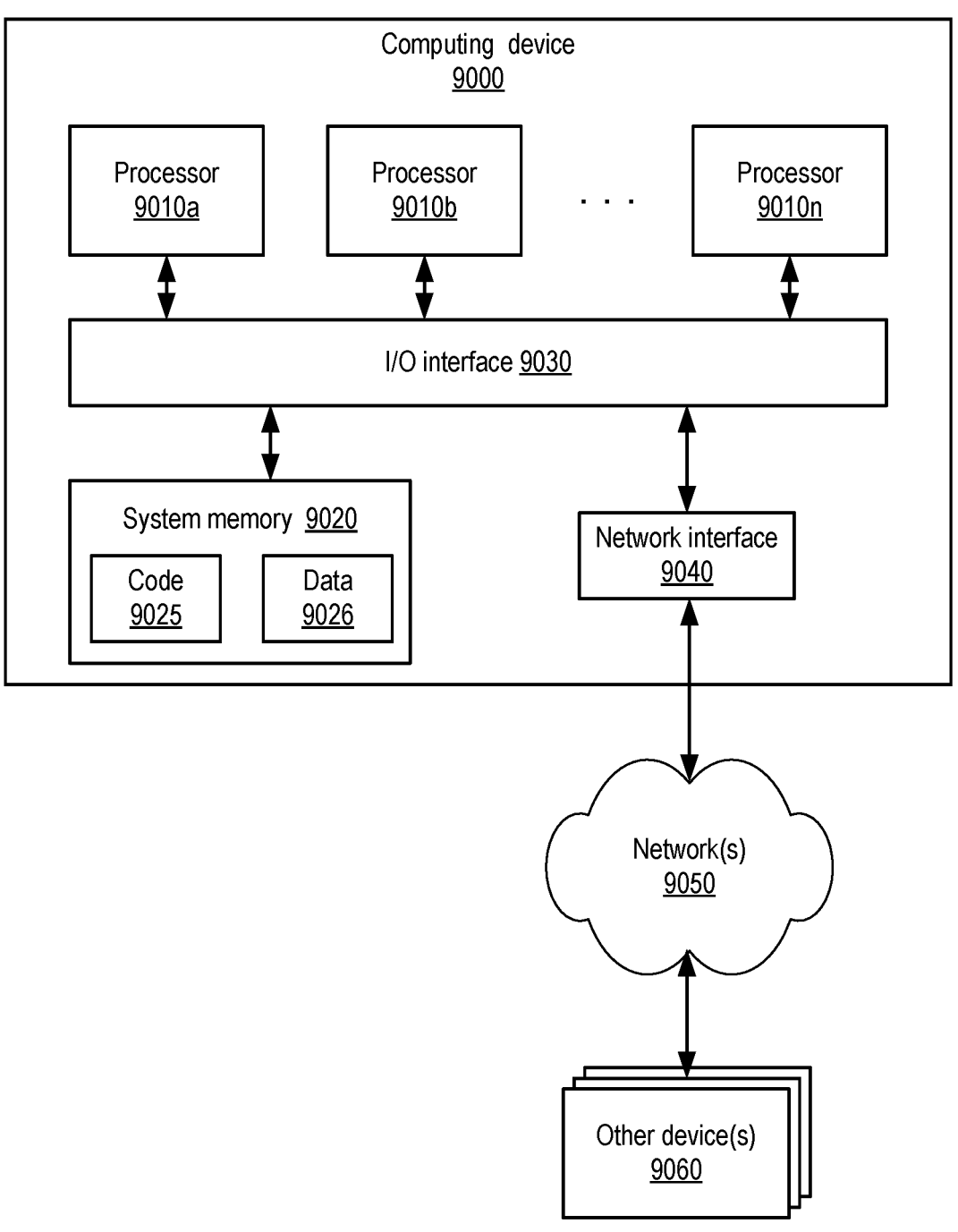
FIG. 10 is a block diagram illustrating an example computing device that may be used in at least some embodiments.

In at least some embodiments, a server that implements the types of techniques described herein (e.g., including the described functionality of various GAMS components and components of other services of cloud provider networks), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
deploy, using resources of a network-accessible generative artificial intelligence (GAI)-based application management service, a first automated conversation intermediary for interactions among a set of conversation contributor entities, wherein individual ones of the conversation contributor entities have respective pre-defined roles associated with multi-turn conversations between one or more chatbots and one or more end users, wherein the respective pre-defined roles belong to a first extensible role set of a conversation management framework, and wherein the first extensible role set includes at least (a) a first user category role, (b) a second user category role, (c) a natural language output source role, (d) an external action invocator role and (e) an external action implementer role;
perform, by the first automated conversation intermediary at the GAI-based application management service, a plurality of operations to orchestrate a particular conversation between at least a first end user and a first chatbot, wherein the first end user has the first user category role, and wherein the plurality of operations includes:
prior to providing, to the first chatbot as part of a prompt, natural language input obtained from the first end user, annotating the natural language input with (a) an indication that the natural language input was obtained from an entity that has the first user category role and (b) at least a first subset of a collection of hidden markers of the conversation management framework, wherein hidden markers of the collection are not included in output provided to the first end user during the particular conversation, wherein individual ones of the hidden markers of the collection comprise respective bit sequences which do not correspond to Unicode encodings, and wherein the first subset includes a turn start marker, a role marker, and a turn end marker;
receiving, from the first chatbot subsequent to processing of the annotated natural language input by the first chatbot, a first chatbot-generated token sequence which includes (a) an indication of a particular external action to be implemented by a particular external action implementer (b) an indication that the first chatbot-generated token sequence was generated by an entity that has an external action invocator role, and (c) a second subset of the collection of hidden markers, wherein the second subset includes the turn start marker, the role marker, the turn end marker, and an action invocation metadata marker;
obtaining an action result token sequence of the particular external action, wherein the action result token sequence is generated at least in part by the particular external action implementer;
prior to appending the action result token sequence to the prompt of the first chatbot, annotating the action result token sequence with (a) an indication that the action result token sequence was obtained from an entity that has the external action implementer role and (b) a third subset of the collection of hidden markers, wherein the third subset includes the turn start marker, the role marker, the turn end marker, and an action result metadata marker;
receiving, from the first chatbot subsequent to processing of the annotated action result token sequence by the chatbot, a second chatbot-generated token sequence which includes (a) a natural language response generated by the first chatbot for the first end user (b) an indication that the second chatbot-generated token sequence was generated by an entity that has a natural language output source role, and (c) a fourth subset of the collection of hidden markers, wherein the fourth subset includes the turn start marker, the role marker, and the turn end marker; and
presenting an unmarked natural language response token sequence to the first end user, wherein the unmarked natural language response token sequence is generated at least in part by removing the fourth subset of hidden markers from the second chatbot-generated token sequence.

2. The system as recited in claim 1, wherein particular conversation comprises interactions between a second end user and the first chatbot, and wherein the plurality of operations includes:
prior to providing, to the first chatbot as part of the prompt, a set of natural language input obtained from the second end user, annotating the set of natural language input with an indication that the set of natural language input was obtained from an entity that has the second user category role.

3. The system as recited in claim 1, wherein the one or more computing devices include further instructions that upon execution on or across the one or more computing devices further cause the one or more computing devices to:

prior to initiation of the particular conversation, fine-tune
the first chatbot using training input which comprises
(a) examples of one or more hidden markers of the
collection of hidden markers and (b) examples of one
or more roles of the first extensible role set.
4. The system as recited in claim 1, wherein the plurality
of operations includes:
receiving, from the first chatbot subsequent to processing
of additional annotated natural language input of the
first end user by the first chatbot, a third chatbot-
generated token sequence which includes (a) a repre-
sentation of a particular intermediate reasoning step
completed by the first chatbot, (b) an indication that the
third chatbot-generated token sequence was generated
by an entity that has a chain-of-thought reasoning
indicator role of the first extensible role set, and (c) a
fifth subset of the collection of hidden markers,
wherein the fifth subset includes the turn start marker,
the role marker, and the turn end marker; and
appending the third chatbot-generated token sequence to
the prompt of the first chatbot.
5. The system as recited in claim 4, wherein the one or
more computing devices include further instructions that
upon execution on or across the one or more computing
devices further cause the one or more computing devices to:
store the indication of the particular intermediate reason-
ing step in a repository; and
present, in response to a programmatic request for an
explanation of natural language output provided to the
first end user during the particular multi-turn conver-
sation, the indication of the particular intermediate
reasoning step.
6. A computer-implemented method, comprising:
performing, by a first automated conversation intermedi-
ary, a plurality of operations during a particular con-
versation between a set of end users and a set of
chatbots, wherein the set of end users includes a first
end user, wherein the set of chatbots includes a first
chatbot, and wherein the plurality of operations
includes:
prior to providing, to the first chatbot as part of a
prompt, natural language input obtained from the
first end user, annotating the natural language input
with (a) an indication that the natural language input
was obtained from an entity that has a first user
category role of a role set defined for conversation
contributing entities in a conversation management
framework, and (b) at least a first subset of a col-
lection of hidden markers of the conversation man-
agement framework, wherein hidden markers of the
collection are not included in output provided to the
first end user during the particular conversation, and
wherein the first subset includes a role marker;
receiving, from the first chatbot subsequent to process-
ing of the prompt by the first chatbot, a first chatbot-
generated token sequence which includes (a) a natu-
ral language response generated by the first chatbot
for the first end user (b) an indication that the first
chatbot-generated token sequence was generated by
an entity that has a natural language output source
role of the role set, and (c) a second subset of the
collection of hidden markers, wherein the second
subset includes the role marker; and
presenting an unmarked natural language response
token sequence to the first end user, wherein the
unmarked natural language response token sequence
is generated at least in part by removing the second subset of hidden markers from the first chatbot-
generated token sequence.
7. The computer-implemented method as recited in claim
6, wherein the plurality of operations includes:
in response to (a) receiving additional natural language
input from the first end user and (b) detecting that the
additional natural language input includes at least one
hidden marker of the collection or hidden markers,
rejecting the additional natural language input and
terminating the particular conversation.
8. The computer-implemented method as recited in claim
6, wherein the plurality of operations includes:
in response to (a) receiving a second chatbot-generated
token sequence from the first chatbot, and (b) detecting
that a natural language output portion of the second
chatbot-generated token sequence includes at least one
hidden marker of the collection of hidden markers,
discarding the second chatbot-generated token
sequence without presenting a portion of the second
chatbot-generated token sequence to the first end user.
9. The computer-implemented method as recited in claim
6, wherein the plurality of operations includes:
receiving, from the first chatbot subsequent to processing
of additional annotated natural language input of the
first end user by the first chatbot, a second chatbot-
generated token sequence which includes (a) an indi-
cation of a particular external action to be implemented
by a particular external action implementer using a
resource other than the first chatbot (b) an indication
that the second chatbot-generated token sequence was
generated by an entity that has an external action
invocator role of the role set, and (c) a third subset of
the collection of hidden markers, wherein the second
subset includes the role marker and an action invoca-
tion metadata marker;
obtaining an action result token sequence of the particular
external action, wherein the action result token
sequence is generated at least in part by the particular
external action implementer; and
prior to appending the action result token sequence to the
prompt of the first chatbot, annotating the action result
token sequence with (a) an indication that the action
result token sequence was obtained from an entity that
has an external action implementer role of the role set
and (b) a fourth subset of the collection of hidden
markers, wherein the fourth subset includes the role
marker and an action result metadata marker.
10. The computer-implemented method as recited in
claim 9, wherein the particular external action includes an
operation performed at one or more of: (a) a read-only data
source, (b) a search engine, or (c) a transaction processing
system.
11. The computer-implemented method as recited in claim
9, wherein (a) the action invocation metadata marker indi-
cates a position, within the second chatbot-generated token
sequence, of metadata associated with a request for invoca-
tion of the particular external action implementer and (b) the
action result metadata marker indicates a position, within the
action result token sequence, of metadata associated with a
result of invoking the particular external action.
12. The computer-implemented method as recited in
claim 11, wherein the metadata associated with the request
for invocation of the particular external action implementer
comprises one or more of: (a) a timestamp, (b) a credential,
or (c) an indication of whether approval from a specified
entity is to be obtained to enable execution of the particular
external action implementer.

13. The computer-implemented method as recited in claim 11, wherein the metadata associated with the result of invoking the particular external action comprises one or more of: (a) a timestamp, or (b) a status indication of the particular external action.

14. The computer-implemented method as recited in claim 6, wherein the plurality of operations includes:

receiving, from the first chatbot subsequent to processing of additional annotated natural language input of the first end user by the first chatbot, a second chatbot-generated token sequence which includes (a) an indication of a particular intermediate reasoning step of the first chatbot (b) an indication that the second chatbot-generated token sequence was generated by an entity that has a reasoning indicator role of the role set, and (c) a third subset of the collection of hidden markers, wherein the third subset includes the role marker; and appending the second chatbot-generated token sequence to the prompt of the first chatbot; and wherein the computer-implemented method further comprises:

storing the indication of the particular intermediate reasoning step in a repository; and presenting, in response to a programmatic request for an explanation of natural language output provided to the first end user during the particular conversation, the indication of the particular intermediate reasoning step.

15. The computer-implemented method as recited in claim 6, wherein training of the first chatbot comprises a pre-training phase and at least one fine-tuning phase, the computer-implemented method further comprising:

in response to determining that a particular role is to added to the role set for one or more additional conversations, performing one or more of: (a) deploying an updated version of the first automated conversation intermediary, wherein the updated version includes logic to detect and process conversation turns associated with the particular role or (b) performing an additional fine-tuning phase of the first chatbot, wherein input provided to the first chatbot during the additional fine-tuning phase includes examples of conversation turns associated with the particular role.

16. One or more non-transitory computer-accessible storage media storing program instructions that when executed on or across one or more processors cause the one or more processors to:

perform, by a first automated conversation intermediary, a plurality of operations during a particular conversation between a set of end users and a set of chatbots, wherein the set of end users includes a first end user, wherein the set of chatbots includes a first chatbot, and wherein the plurality of operations includes:

prior to providing, to the first chatbot as part of a prompt, natural language input obtained from the first end user, annotating the natural language input with (a) an indication that the natural language input was obtained from an entity that has a first user category role of a role set defined for conversation contributing entities in a conversation management framework, and (b) at least a first subset of a collection of hidden markers of the conversation management framework, wherein hidden markers of the collection are not included in output provided to the first end user during the particular conversation, and wherein the first subset includes a role marker;

receiving, from the first chatbot subsequent to processing of the prompt by the first chatbot, a first chatbot-generated token sequence which includes (a) a natural language response generated by the first chatbot for the first end user (b) an indication that the first chatbot-generated token sequence was generated by an entity that has a natural language output source role of the role set, and (c) a second subset of the collection of hidden markers, wherein the second subset includes the role marker; and presenting an unmarked natural language response token sequence to the first end user, wherein the unmarked natural language response token sequence is generated at least in part by removing the second subset of hidden markers from the first chatbot-generated token sequence.

17. The one or more non-transitory computer-accessible storage media as recited in claim 16, wherein the plurality of operations includes:

in response to (a) receiving additional natural language input from the first end user and (b) detecting that the additional natural language includes a particular hidden marker of the collection or hidden markers, removing at least the particular hidden marker from the additional natural language prior to providing an annotated version of the additional natural language to the first chatbot.

18. The one or more non-transitory computer-accessible storage media as recited in claim 16, wherein the plurality of operations includes:

in response to (a) receiving a second chatbot-generated token sequence from the first chatbot, and (b) detecting that a natural language output portion of the second chatbot-generated token sequence includes a particular hidden marker of the collection of hidden markers, removing at least the particular hidden marker from the natural language output portion prior to providing the natural language output portion to the first end user.

19. The one or more non-transitory computer-accessible storage media as recited in claim 16, wherein the plurality of operations includes:

receiving, from the first chatbot subsequent to processing of additional annotated natural language input of the first end user by the first chatbot, a second chatbot-generated token sequence which includes (a) an indication of a particular external action to be implemented by a particular external action implementer using a resource other than the first chatbot (b) an indication that the second chatbot-generated token sequence was generated by an entity that has an external action invocator role of the role set, and (c) a third subset of the collection of hidden markers, wherein the second subset includes the role marker and an action invocation metadata marker;

obtaining an action result token sequence of the particular external action, wherein the action result token sequence is generated at least in part by the particular external action implementer; and prior to appending the action result token sequence to the prompt of the first chatbot, annotating the action result token sequence with (a) an indication that the action result token sequence was obtained from an entity that has an external action implementer role of the role set and (b) a fourth subset of the collection of hidden markers, wherein the fourth subset includes the role marker and an action result metadata marker.

20. The one or more non-transitory computer-accessible storage media as recited in claim 16, wherein the plurality of operations includes:

receiving, from the first chatbot subsequent to processing of additional annotated natural language input of the first end user by the first chatbot, a second chatbot-generated token sequence which includes (a) an indication of a particular intermediate reasoning step of the first chatbot (b) an indication that the second chatbot-generated token sequence was generated by an entity that has a reasoning indicator role of the role set, and (c) a third subset of the collection of hidden markers, wherein the third subset includes the role marker; and appending the second chatbot-generated token sequence to the prompt of the first chatbot.

\* \* \* \* \*